United States Patent [19]

Matsui et al.

[11] Patent Number: 5,491,203
[45] Date of Patent: Feb. 13, 1996

[54] POLYORGANOSILOXANE AND PROCESS FOR PRODUCING THE SAME

[75] Inventors: Fumio Matsui; Nobuo Uotani; Masatoshi Murakami; Yuji Itoh, all of Kanagawa, Japan

[73] Assignee: Showa Denko K. K., Tokyo, Japan

[21] Appl. No.: 302,255

[22] Filed: Sep. 8, 1994

[51] Int. Cl.⁶ .................................................. C08F 283/00
[52] U.S. Cl. ........................ 525/474; 525/476; 525/477; 525/479; 528/10; 528/12; 528/14; 528/34; 528/42; 528/43
[58] Field of Search ................................ 528/10, 12, 34, 528/42, 43; 525/474, 476, 477, 479

[56] References Cited

U.S. PATENT DOCUMENTS

| | | | |
|---|---|---|---|
| 5,030,699 | 7/1991 | Motoyama et al. | 525/477 |
| 5,057,396 | 10/1991 | Tanaka et al. | 528/31 |
| 5,236,984 | 8/1993 | Yamamoto et al. | 528/10 |

OTHER PUBLICATIONS

Ban—Ishai et al, "The Amidoalkylation of Aromatic Compounds and Olefins with 5–Alkoxyhydantions(1,2)", *Technion—Isreal Institute of Technology*, 7:1289–1293 (Dec. 1970).

*Primary Examiner*—Melvyn I. Marquis
*Attorney, Agent, or Firm*—Sughrue, Mion, Zinn, Macpeak & Seas

[57] ABSTRACT

This invention relates to a polyorganosiloxane comprising a polymethylsilsesquioxane structure as a main structural unit and having a methyl group and a reactive group at the side chains thereof, which is suitable as a polymer modifier; a process for producing the same; a copolymer resin obtained by polymerizing the polyorganosiloxane with a polymerizable monomer or by reacting the polyorganosiloxane with a polymer; a method for crosslinking the copolymer resin; and a coating composition containing the copolymer resin.

26 Claims, No Drawings

POLYORGANOSILOXANE AND PROCESS FOR PRODUCING THE SAME

FIELD OF THE INVENTION

This invention relates to a polyorganosiloxane comprising a polymethylsilsesquioxane structure as a main structural unit and having a methyl group and a reactive group at the side chains thereof, which is suitable as a polymer modifier; a process for producing the same; a copolymer resin obtained by polymerizing the polyorganosiloxane with a polymerizable monomer or by reacting the polyorganosiloxane with a polymer; a method for crosslinking the copolymer resin; and a coating composition containing the copolymer resin.

BACKGROUND OF THE INVENTION

A ladder structure is deemed to be an ideal molecular structure for heat-resistant polymers. Carbocyclic or heterocyclic ladder polymers heretofore proposed include polyacene and polyperynaphthalene. It is also known that polyimide having partially incorporated thereinto a ladder structure exhibits improved performance properties. The reaction for introducing a ladder structure into these carbon series polymers can be achieved only under extremely severe conditions, while polysiloxanes having a ladder structure can be synthesized under relatively mild conditions because the synthesis consists in condensation based on an equilibrium reaction and also because condensation proceeds via a cyclic compound, and therefore, have been given study for years.

However, the chief subject of the conventional study on polysiloxane has been centered at ladder silicone having a phenyl type substituent at the side chain thereof, because it is easy to obtain this type of ladder silicone with high structural regularity and the product has excellent storage stability. For example, Nakahama, et al. synthesized ladder silicone having a phenyl group and a methacryloxypropyl group at the side chain thereof and incorporated this structure into a polystyrene molecular structure as disclosed in *Polymer Preprints Japan*, Vol. 29, No. 1, p. 73 (1980).

Nakahama, et al. mentioned in their report that synthesis of ladder silicone having both a methyl group and a reactive group was impossible due to occurrence of gelation. In general, it is admittedly difficult to synthesize ladder silicone having a methyl group at the side chain without being accompanied by gelation on account of its extremely high reactivity. Even if it can be synthesized, the product is unstable that it cannot be stored either as frozen or as dissolved in low concentrations.

The present inventors have keenly realized based on analysis of various data that it is ladder silicone having a methyl group at the side chain thereof that can draw out the best characteristics of ladder silicone, such as hardness, heat resistance, weather resistance, and light resistance.

On the other hand, it is known in the art that characteristics of organic polymers can be improved by incorporating a polysiloxane structure into the main chain or side chain thereof in various ways. For example, JP-A-60-231720 (the term "JP-A" as used herein means an "unexamined published Japanese patent application") discloses a process for preparing a polysiloxane-grafted copolymer with a polysiloxane structure in the side chain thereof by radical copolymerization of a siloxane-containing monomer and an ethylenically unsaturated monomer or a diene monomer. It is mentioned here that the resulting polysiloxane-grafted copolymer is excellent in surface properties, such as water repellency, stain resistance and release properties, and durability.

However, if the polysiloxane content in a polymer is increased aiming at further improvement in durability, the resulting polysiloxane-grafted copolymer would have reduced hardness, getting liable to scratches, and also reduced stain resistance because polysiloxane itself has softness.

JP-A-62-275132 proposes a process for producing a vinyl polymer having incorporated thereinto a siloxane side chain having two or more functional groups, which comprises copolymerizing a vinyl monomer with a polysiloxane macromonomer containing a polymethylsilsesquioxane structure (i.e., a ladder structure) and having two or more functional groups selected from a hydroxyl group and an alkoxy group. It is mentioned here that the polysiloxane-containing vinyl polymer is excellent in crosslinkability and compatibility with other resins as well as other characteristics, such as weather resistance, light resistance, water resistance, and stain resistance. This polysiloxane-containing polymer has high hardness despite of a high polysiloxane content since the polysiloxane structure thereof has a ladder structure and, in addition, the crosslinking density is increased by the functional groups. However, such a vinyl polymer having incorporated thereinto a siloxane side chain has also been demanded to have further improved durability and hardness.

As stated above, a polymethylsilsesquioxane having, in its side chains, a methyl group in a given or higher proportion and an aromatic group in a small proportion and also having, in its terminals or side chains, a functional group, such as a hydroxyl group, an alkoxy group, etc., is extremely liable to gelation due to the high reactivity of the functional group, as reported by Nakahama, et al. (*Polymer Preprints, Japan*, Vol. 29, No. 1, p. 73 (1980)).

Thus, it is very difficult to avoid gelation in synthesizing a polysiloxane having, in its side chains, a given or larger number of a methyl group and also having, in its terminals or side chain, functional a given or larger number of functional groups, such as a hydroxyl group, an alkoxy group, etc. Moreover, a polymer having such a polysiloxane structure incorporated into the molecule thereof has poor storage stability.

The above-mentioned polysiloxane-containing vinyl polymer as described in JP-A-62-275132 has high hardness owing to its high crosslink density but tends to lose crack-bridging properties on a substrate on which it is applied when the substrate undergoes great changes in humidity, temperature, or the like conditions.

A combined use of a soft polydialkylsiloxane and a rigid polyorganosilsesquioxane is expected to provide well-balanced physical properties. However, these two materials are poorly compatible with each other, and realization of such an attempt would encounter great difficulty. Along this line, JP-A-5-209031 offers a solution to the problem of compatibility between a polydialkylsiloxane and a polymethylsilsesquioxane by modifying a polydialkylsiloxane with a special acrylic resin. According to this technique, a polymethylsilsesquioxane and a polydialkylsiloxane are separately prepared as individual reactive oligomers, which are combined in a step of curing. Therefore, the method of curing and conditions therefor are naturally so limited, and yet it is difficult to obtain desired properties in a stable manner.

SUMMARY OF THE INVENTION

An object of the present invention is to provide a polyorganosiloxane mainly comprising a polyorganosilsesquioxane structure, which has excellent storage stability and can be produced without involving gelation.

Another object of the present invention is to provide a process for producing the above-mentioned polyorganosiloxane.

A further object of the present invention is to provide a copolymer resin having excellent durability and storage stability which is obtained by polymerization reaction of the above-mentioned polyorganosiloxane with a polymerizable monomer or a polymer.

A still further object of the present invention is to provide a method for crosslinking the above-mentioned copolymer resin.

A yet further object of the present invention is to provide a coating composition containing the above-described copolymer resin.

Other objects and effects of the present invention will be apparent from the following description.

The present invention relates to, as a first aspect, a polyorganosiloxane comprising a repeating unit represented by formula (I) and an end cap group represented by formula (II):

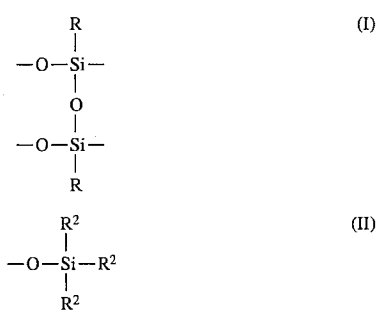

the polyorganosiloxane further comprising an end group represented by formula (III), an end group represented by formula (IV), and a repeating unit represented by formula (V):

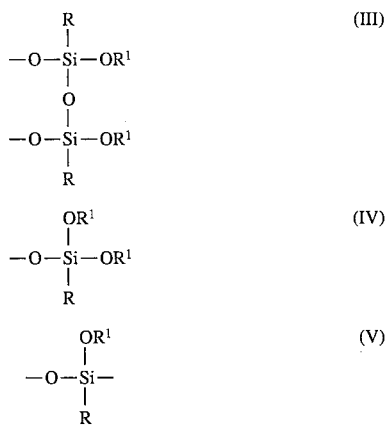

in such a manner that the average number of the group represented by $OR^1$ directly bonded to the silicon atom is 0 or more and less than 2 per one molecule of the polyorganosiloxane, the polyorganosiloxane having a number average molecular weight of from 500 to 100,000, wherein from 50 to 99% by mole of R represents a methyl group, from 1 to 40% by mole of R represents a group capable of being copolymerized with a polymerizable monomer or capable of reacting with a polymer, and the balance of R represents an alkyl group having from 2 to 8 carbon atoms or an unsubstituted or substituted phenyl group; $R^1$ represents a hydrogen atom or an alkyl group having from 1 to 4 carbon atoms, plurality of $R^1$ may be the same or different; and $R^2$ represents an alkyl group having from 1 to 8 carbon atoms or an aryl group having from 6 to 8 carbon atoms, plurality of $R^2$ may be the same or different.

In the above polyorganosiloxane of the first aspect of the present invention, $R^2$ preferably represents a methyl group, and the group capable of being copolymerized with a polymerizable monomer or capable of reacting with a polymer is preferably selected from the group consisting of a vinyl group, an acryl group, a methacryl group, an alkenyl group, an epoxy group, an amino group, a mercapto group, an alcoholic hydroxyl group, a carboxyl group, an amidoxime group, a sulfo group, a chlorosulfo group, an aldehyde group, an acetylacetonato group, and organic groups having these groups.

The present invention also relates to, as a second aspect, a process for producing the above polyorganosiloxane, the process comprising the steps of:

preparing a starting polyorganosiloxane which comprises a repeating unit represented by formula (I) and an end group represented by formula (III) and may further comprises an end group represented by formula (IV) and a repeating unit represented by formula (V); and reacting the starting polyorganosiloxane with a monofunctional silylating agent to substitute the group represented by $OR^1$ directly bonded to the silicon atom with an end cap group represented by formula (II), in such a manner that the average number of the group represented by $OR^1$ becomes 0 or more and less than 2 per one molecule of the polyorganosiloxane.

In the above process of the second aspect of the present invention, the preparation step of the starting polyorganosiloxane preferably comprises a hydrolytic condensation reaction of a compound represented by formula (VI):

$$R-Si(OR^1)_3 \qquad (VI)$$

wherein $R^1$ represents an alkyl group having from 1 to 4 carbon atoms; and R has the same meaning as above, and an alcohol by-produced in the hydrolytic condensation reaction is preferably used as a solvent for the substitution reaction of the end cap group represented by formula (II).

The monofunctional silylating agent used in the process of the second aspect is preferably hexamethyldisiloxane.

In the step where the compound represented by formula (VI) is subjected to a hydrolytic condensation reaction, water is preferably used in an amount of from 2 to 4 times by mole the amount of the compound represented by formula (VI), and an acidic catalyst is preferably used in an amount of from 0.005 to 0.05 times by mole the amount of the compound represented by formula (VI).

The present invention further relates to, as a third aspect, a copolymer resin comprising the polyorganosiloxane of the first aspect of the present invention, which is copolymerized with a monomer capable of reacting with the group represented by R capable of being copolymerized with the monomer.

The copolymer resin of the third aspect of the present invention preferably comprises the polyorganosiloxane of the first aspect, which is copolymerized with a polydialkylsiloxane having at least one ethylenic polymerizable group per one molecule and an ethylenic monomer.

The copolymer resin of the third aspect of the present invention also preferably comprises the polyorganosiloxane of the first aspect, wherein the group represented by R capable of being copolymerized with a monomer or capable of reacting with a polymer is a 3-methacryloxypropyl group, which is copolymerized with an acrylic acid, a methacrylic acid, or an ester thereof, in the presence of a radical polymerization initiator.

The present invention further relates to, as a fourth aspect, a copolymer resin comprising the polyorganosiloxane of the first aspect, which is reacted with a polymer capable of reacting with the group represented by R capable of being reacted with the polymer.

The present invention further relates to, as a fifth aspect, a method for crosslinking a copolymer resin comprising the step of crosslinking the copolymer resin of the third or fourth aspect of the present invention, by using an isocyanate compound or a methylolmelamin; or by a reaction of a carboxyl group with an epoxy group, both contained in the copolymer.

The present invention further relates to, as a sixth aspect, a coating composition comprising the copolymer resin of the third or fourth aspect of the present invention.

The present invention further relates to, as a seventh aspect, a method for coating the coating composition of the sixth aspect of the present invention, the method comprising the step of crosslinking the copolymer resin, by using an isocyanate compound or a methylolmelamin; or by a reaction of a carboxyl group with an epoxy group, both contained in the copolymer.

DETAILED DESCRIPTION OF THE INVENTION

In the polyorganosiloxane of the present invention, the side chain group R comprises from 50 to 99% by mole, preferably from 55 to 97% by mol, more preferably from 65 to 95% by mol, of a methyl group; from 1 to 40% by mole, preferably from 2 to 40% by mol, more preferably from 3 to 30% by mol, of a group capable of being copolymerized with a polymerizable monomer or capable of reacting with a polymer (hereinafter referred to as a reactive group); and the balance, preferably 10% by mol or less, more preferably 5% by mol or less, of an alkyl group having from 2 to 8 carbon atoms or a substituted or unsubstituted phenyl group.

If the proportion of a methyl group in the side chain organic group R is less than 50 mol %, a polymer into which the polyorganosiloxane has been introduced by using the reactive group (hereinafter referred to as a modified polymer) could not have sufficient characteristics, such as hardness and weather resistance. If the proportion of a methyl group exceeds 99 mol %, the proportion of the reactive group becomes relatively low. It follows that a modified polymer tends to have insufficient durability.

If the proportion of the reactive group exceeds 40 mol %, a modified polymer has an increased crosslink density and thereby increased hardness, but on the other hand becomes brittle, showing poor crack-bridging properties for distortion or impact. If the proportion of the reactive group is less than 1 mol %, a modified polymer tends to have insufficient durability.

The reactive group as R is a functional group having reactivity to serve for incorporating the polymethylsilsesquioxane structure of the polyorganosiloxane of the present invention into the main chain and/or side chain of a polymer. Examples of such a reactive group include a vinyl group, an acryl group, a methacryl group, an alkenyl group, an epoxy group, an amino group, a mercapto group, an alcoholic hydroxyl group, a carboxyl group, an amidoxime group, a sulfo group, a chlorosulfo group, an aldehyde group, an acetylacetonato group, and a combination of two or more kinds of these groups. Among these groups, a vinyl group, an acryl group, a methacryl group, an epoxy group, an alcoholic hydroxyl group, and a carboxyl group are preferred, with a vinyl group, an acryl group, a methacryl group, and an epoxy group being more preferred. An organic group having the above-enumerated reactive group as a substituent also serves as a reactive group R.

Of all the side chain groups represented by R, the groups other than a methyl group and a reactive group (or an organic group having a reactive group as a substituent) are selected from an alkyl group having from 2 to 8 carbon atoms and a substituted or unsubstituted phenyl group. These other groups are unfavorable to hardness, durability or other characteristics and therefore their proportion is desirably minimized.

The polyorganosiloxane of the present invention has a number average molecular-weight of from 500 to 100,000, preferably from 1,000 to 10,000. If the number average molecular weight is less than 500, properties characteristic of ladder silicone, such as hardness and stain resistance, are insufficient. Such a highly viscous polyorganosiloxane as has a number average molecular weight exceeding 100,000 is hard to handle and has poor storage stability, tending to undergo gelation. The number average molecular weight of the polyorganosiloxane can be measured easily by gel-permeation chromatography (GPC) using polystyrene as a standard substance. The present inventors have lent confirmation to a very good agreement of the molecular weight as measured by GPC with the number average molecular weight as measured by other methods such as a vapor pressure osmometry (VPO).

While the polyorganosiloxane according to the present invention and the starting polyorganosiloxane Which provides the basic skeleton of that polyorganosiloxane mainly comprise a polyorganosilsesquioxane structural unit, i.e., a ladder structure, they may contain in parts a linear repeating unit and a linear end group. More specifically, the starting polyorganosiloxane comprises a repeating unit having a ladder structure as represented by formula (I) and an end group having a ladder structure as represented by formula (III) and may further comprise in parts a linear repeating unit represented by formula (V) and a linear end group represented by formula (IV). In general, the linear repeating unit and the linear end group may-be formed upon preparation of an polyorganosiloxane due to dislocation or other reasons, even if a monomer forming such linear units is not intentionally used. The proportion of the linear repeating unit and the linear end group is preferably minimized as possible.

The polyorganosiloxane of the present invention is derived from the above-mentioned starting polyorganosiloxane by displacing $OR^1$ in the repeating unit of formula (V) and the end groups of formulae (III) and (IV), directly bonded to Si, with the end cap group represented by formula (II), so that the average number of the group $OR^1$ because (II), so that the average number of the group $OR^1$ because less than 2 per molecule. That is, the average number of the group $OR^1$ per molecule of the polyorganosiloxane of the present invention should be less than 2, preferably less than 1.5. If it is 2 or more, the polyorganosiloxane has poor storage stability.

The term "end cap group" used herein means a group capable of preventing a condensation reaction of a hydroxyl or alkoxy group directly bonded to Si by displacing the hydroxyl or alkoxy group with itself.

In the end cap group of formula (II), the plural groups $R^2$ which may be the same or different, each represent an alkyl group having from 1 to 8 carbon atoms or an aryl group having from 6 to 8 carbon atoms, and preferably a methyl group or an ethyl group, with a methyl group being more preferred.

The process for producing the polyorganosiloxane according to the present invention will now be explained.

First of all, the above-described starting polyorganosiloxane is to be prepared. The starting polyorganosiloxane can be obtained by co-hydrolytic condensation of trialkoxysilanes. The group $OR^1$ of the starting polyorganosiloxane will be a hydroxyl group or an alkoxy group in using trialkoxysilanes.

Specific examples of the trialkoxysilane as a starting material include methyltrimethoxysilane, methyltriethoxysilane, and methyltripropoxysilane.

In order to introduce a reactive group, an alkyl group having 2 to 8 carbon atoms, or a substituted or unsubstituted phenyl group as a side chain group R, a methyltrialkoxysilane with its methyl group substituted with a desired reactive group, an alkyl group having 2 to 8 carbon atoms or a substituted or unsubstituted phenyl group can be used as a starting compound.

Examples of such a reactive group-substituted trialkoxysilane, which can be used for preparing the starting polyorganosiloxane, include vinyltriethoxysilane, allyltrimethoxysilane, 3-methacryloxypropyltrimethoxysilane, 3-mercaptopropyltrichlorosilane, 3-glycidoxypropyltrimethoxysilane, 3-aminopropyltrimethoxysilane, and 3-hydroxypropyltrimethoxysilane.

Alternatively, the starting polyorganosiloxane may also be prepared by first preparing a polyorganosiloxane having a reactive group precursor capable of becoming the reactive group and then converting the reactive group precursor to the reactive group through a polymer reaction.

In the preparation of the starting polyorganosiloxane by hydrolytic condensation of trialkoxysilanes the reaction is carried out in the presence of from 2 to 4 mols of water and from 0.005 to 0.05 mol of an acid each per mole of the total starting trialkoxysilanes. After the hydrolytic condensation, the reaction mixture may be neutralized with a base, if desired. Subsequently, a base is added to the reaction mixture in an amount of from 0,005 to 0.05 mol per mol of the total trialkoxysilanes to thereby accelerate the molecular weight increase by condensation, and the existing water and by-produced salt are then removed.

If the amount of water in the hydrolytic condensation reaction system is less than 2 times by mole the total starting trialkoxysilanes and trichlorosilenes, sufficient progress of hydrolysis may not be ensured. If it exceeds 4 times by mole, a condensation reaction abruptly takes place, tending to cause gelation.

The amount of acid or base used in the above reaction ranges from 0.005 to 0.05 mol per mol of the total trialkoxysilanes. If it is less than 0.005 mol, hydrolysis and condensation are seriously retarded to reduce reaction efficiency. If it exceeds 0.05 mol, an irregular three-dimensional condensation reaction tends to occur, resulting in not only a failure of obtaining a highly regular ladder structure but also gelation.

Examples of the acid which can be used in the above reaction include hydrochloric acid, sulfuric acid, acetic acid, and formic acid. Examples of the base to be used include n-butylamine, triethylamine, dimethylaminoethanol, sodium hydroxide, potassium hydroxide, ethylenediamine, and diethylamine.

In order to obtain a polyorganosiloxane having a number average molecular weight of from 1,000 to 3,000, it is preferable to use only an acid as a catalyst for hydrolysis and condensation. To obtain a polyorganosiloxane having a number average molecular weight exceeding 3,000, it is preferable to use an acid as a catalyst for hydrolytic condensation in the first stage of the reaction to once produce a low-molecular weight polymer and then add a base as a catalyst to increase the molecular weight of the polymer.

The reaction is usually conducted at a temperature of from −20° to 100° C. for a period of from 1 to 24 hours. It is recommended for increasing regularity of the ladder structure to conduct the first hydrolysis reaction at a relatively low temperature of from −20° to 50° C. for 0.5 to 1 hour and then elevate the reaction temperature to 50° to 100° C., preferably 60° to 90° C. at which the reaction is continued for an additional period of from 1 to 23 hours.

The condensation reaction can be ceased by neutralization of the reaction mixture. The salt produced on neutralization is removed by filtration, washing with water or the like means. In some cases, removal of the salt must be preceded by complete removal of water. This being the case, any solvent having azetropy with watar, such as a high-boiling point alcohol or toluene, may be added to the resulting solution, followed by distillation to remove water.

The thus prepared starting polyorganosiloxane is then reacted with a monofunctional silylating agent to substitute the hydroxyl group and/or alkoxy group represented by $OR^1$ with an end cap group represented by formula (II) so as to making the average number of the group $OR^1$ be less than 2 per molecule.

A polyorganosiloxane having two or more $OR_1$ groups per molecule in average is unstable labile and ready to form gellation during storage. Further, a modified polymer containing such a polyorganosiloxane has too poor storage stability and is liable to form gellation upon production thereof, resulting in difficulties in practical use.

The plural groups $R^2$ in the end cap group of formula (II), which may be the same or different, each represent an alkyl group having from 1 to 8 carbon atoms or an aryl group having from 6 to 8 carbon atoms, and preferably a methyl group.

The silylation reaction of a starting material (polyorganosiloxane) can be carried out by adding a silylating agent to a solution of the starting material (polyorganosiloxane).

The silylating agent to be used include compounds that do not contain halosilane and are hard to be influenced by an exceeding amount of water used in hydrolysis, or compounds capable of becoming a silylating agent through hydrolysis under an acidic condition. Examples of the silylating agent include compounds represented by formula (VIII):

wherein $R^3$, $R^4$, and $R^5$, which may be the same or different, each represents an unsubstituted or substituted hydrocarbon group; and X represents a hydroxyl group or a group capable of being decomposed hydrolytically.

Examples of the group capable of being decomposed hydrolytically include a hydrogen atom, a mercapto group, a halogen atom, an amino group, a carboxyl group, an unsubstituted or substituted hydrocarbon-oxy group (such as an aralkyloxy group or an aryloxy group), an amino group, an unsubstituted or substituted hydrocarbon-carbonyloxy group, or a compound containing a group represented by formula (IX):

wherein $R^6$, $R^7$, $R^8$, which may be the same or different, each represents an unsubstituted or substituted hydrocarbon group; and Y represents an oxygen atom or an imino group.

Specific examples of silylating agent include hexamethyldisiloxane, trimethylsilanol, chloromethyldimethylethoxysilane, ethoxydimethylvinylsilane, allyloxydimethylvinylsilane, 1-chloromethylethoxydimethylsilane, 3-aminopropyldimethylethoxysilane, trimethylpentyloxysilane, chloromethyldimethylphenoxysilane, dimethylfurfuryloxyvinylsilane, butyl-2-hydroxyethylthiomethyldimethylsilane, dimethylethynyl-2,4,5-trichlorophenoxysilane, 2,4-dichlorophenoxyethynyldimethylsilane, trimethylsilylbenzoate, benzyloxychloromethyldimethylsilane, 3-aminophenoxydimethylvinylsilane, dimethylethoxy-3-glycidoxypropylsilane, dimethyl-2-((2-ethoxyethoxy)ethoxy)vinylsilane, methoxytripropylsilane, dimethyl-3-methyl-4-chlorophenoxyvinylsilane, dimethyl-2-methyl-4-chlorophenoxyvinylsilane, chloromethyldimethyl-2-phenylethoxysilane, benzyldimethylethoxysilane, dimethyl-2-piperidinoethoxyvinylsilane, triethylsilylbenzoate, benzylidene-3-ethoxydimethylsilylpropylamine, diphenylethoxymethylsilane, diphenylethoxyvinylsilane, acetyltriphenylsilane, ethoxytriphenylsilane, triphenylsilanol, triethylsilanol, tripropylsilanol, tributylsilanol, 1,3-diethynyl-1,1,3,3-tetramethyldisiloxane, N,O-bis(trimethylsilyl)trifluoroacetamide, 1,3-divinyl-1,1,3,3-tetramethyldisiloxane, bis(trimethylsilyl)uracil, 1,3-bis(acetoxymethyl)tetramethyldisiloxane, 1-(N,N-dimethylthiocarbamoylthiomethyl)-1,1,3,3-tetramethyl-3-vinylsiloxane, 1,3-bis(3-chloropropyl)tetramethyldisiloxane, 1.3-bis(3-mercaptopropyl)tetramethyldisiloxane, 1,3-bis(3-hydroxypropyl)-1,1,3,3-tetramethyldisiloxane, 1,3-bis(3-aminopropyl)tetramethyldisiloxane, 1,3-bis(2-aminoethylaminomethyl)-1,1,3,3-tetramethyldisiloxane, 3-methylpiperidinomethylpentamethyldisiloxane, 4-methylpiperidinomethylpentamethyldisiloxane, hexaethyldisiloxane, 1,3-dibutyl-1,1,3,3-tetramethyldisiloxane, 1-(2-methylpiperidinomethyl)-1,1,3,3-tetramethyl-3-vinyldisiloxane, 1-(4-methylpiperidinomethyl)-1,1,3,3-tetramethyl-3-vinyldisiloxane, pentamethyl- 3-piperidinopropyldisiloxane, 1,3-bis(3-acetoxypropyl)tetramethyldisiloxane, 1,3-bis(3-(N-methylcarbamoyloxypropyl))-1,1,3,3-tetramethyldisiloxane, 3-(4-methylpiperidinopropyl)pentamethyldisiloxane, 3-(2-methylpiperidinopropyl)pentamethyldisiloxane, 1,3-diphenyl-1,1,3,3-tetramethyldisiloxane, 1,3-bis(dioxyarylethyl)-1,1,3,3-tetramethyldisiloxane, 1,3-bis(3-grycidoxypropyl)-1,1,3,3-tetramethyldisiloxane, hexapropyldisiloxane, 1,3-dimethyl-1,1,3,3-tetraphenyldisiloxane, 1,1,3,3-tetraphenyl-1,3-divinyldisiloxane, allyldimethylsilane, diethylmethylsilane, triethylsilane, butyldimethylsilane, dimethylphenylsilane, methylphenylvinylsilane, tripropylsilane, diphenylmethylsilane, triphenylsilane, 1-piperidinomethyl-1,1,3,3-tetramethyl-3-vinyldisiloxane, 1,3-divinyl-1,1,3,3-tetramethyldisiloxane, and pentamethylpiperidinomethyldisiloxane.

In a preferred embodiment of the present invention, trimethylsilylation may be effected by reacting a starting polyorganosiloxane, in which the side chain groups R comprises from 50 to 99 mol % of a methyl group, from 1 to 40 mol % of a reactive group (or an organic group having a reactive group as a substituent), and the balance of an alkyl group having from 2 to 8 carbon atoms or a substituted or unsubstituted phenyl group, with trimethylsilanol as a silylating agent. It is more effective to react the starting polyorganosiloxane with hexamethyldisiloxane as a silylating agent under a weakly acidic condition. In this case, hexamethyldisiloxane is used in slight excess over a theoretical amount; a small amount of a solvent, such as ethanol, is used; and the reaction is performed at 50 to 100° C. for 1 to 8 hours. These reaction conditions are subject to variation depending on the kind of the starting polyorganosiloxane, the degree of trimethylsilylation, the kind of the solvent, and the type of the reaction solution.

The amount of $OR^1$ group contained in the polyorganosiloxane of the present invention can be measured in the following manner: The $OR^1$ groups contained in the polyorganosiloxane can be completely reacted by adding hexamethyldisiloxane with heating at about 70° C. under a weakly acidic condition, as determined by an NMR analysis. An excess amount of hexamethyldisiloxane is added to the polyorganosiloxane to be measured, and its remaining amount is measured to determine its consumed amount. The remaining amount of hexamethyldisiloxane can be measured by GPC. The absolute molecular weight of the polyorganosiloxane is measured with a VPO. The amount of $OR^1$ group per one molecule of the polyorganosiloxane can be determined from the above two measurement results. In a practical procedure, it is preferred that the $OR^1$ amount of the starting polyorganosiloxane is firstly determined, and the silylation reaction is then conducted to make the polyorganosiloxane to have a predetermined silylation degree.

In a preferred embodiment of the present invention, an alcohol (preferably methanol, ethanol or a mixture of them) which is by-produced in the hydrolytic condensation reaction of a trialkoxysilane for preparing the starting polyorganosiloxane is used as a solvent for the substitution reaction for substituting $OR^1$ with the end cap group of formula (II).

In a still preferred embodiment, the starting polyorganosiloxane is prepared by hydrolytic condensation of a plurality of compounds represented by formula (VI):

wherein $R^1$ represents an alkyl group having from 1 to 4 carbon atoms; and R is as defined above, and an alcohol by-produced in that hydrolytic condensation reaction is used as a substantial solvent for the step of substituting $OR^1$ directly-bonded to the silicon atom with the end cap group of formula (II). In this embodiment, the hydrolytic condensation reaction of the compound of formula (IV) is preferably carried out in the presence of water of an amount of from 2 to 4 times by mole the compound of formula (VI) and an acidic catalyst of an amount of from 0.005 to 0.05 times by mole the compound of formula (VI).

The thus prepared polyorganosiloxane according to the present invention which mainly comprises a polymethylsilsesquioxane structure and having a reactive group in the side chain thereof is soluble in organic solvents, such as alcohols, e.g., ethanol, isopropanol and butanol; ethers, e.g., tetrahydrofuran and diethyl ether; ether alcohols, e.g., ethylene glycol monoethyl ether and ethylene glycol monomethyl ether; ketones, e.g., acetone, methyl ethyl ketone, and methyl isobutyl ketone; esters, e.g., ethyl acetate and butyl acetate; and aromatic hydrocarbons, e.g., toluene and xylene.

The copolymer resin according to the present invention, which is prepared by using the above-mentioned polyorganosiloxane, is then explained below. The copolymer resin is a modified polymer having a polymethylsilsesquioxane structure, in which the polyorganosiloxane of the present invention is bonded to a base polymer through a reaction of the reactive group. Such a copolymer resin is excellent in storage stability as well as durability.

Various general-purpose polymers can be a base polymer. Examples of the base polymers include acrylic resins, polyolefin resins, vinyl resins, polyester resins, polyether resins, polyamide resins, polyimide resins, polyurethane resins, fluorine resins, epoxy resins, and amino resins, with acrylic resins, vinyl resins, polyester resins, polyurethane resins, fluorine resins, and amino resins being preferred.

The copolymer resin of the present invention in which the polyorganosiloxane of the present invention is bonded to the main chain and/or side chain of a base polymer is preferably obtained by (i) copolymerizing the polyorganosiloxane with a monomer providing the base polymer or (ii) reacting the polyorganosiloxane with a base polymer having a reactive group capable of reacting with the reactive group of the polyorganosiloxane to form a conjugated bond.

The above reactions (i) and (ii) are preferably conducted in the presence of polymerization initiators or polymerization catalysts such as organic peroxides. In the case where the base polymer is to be produced through radical polymerization, organic peroxide series polymerization initiators such as benzoyl peroxide and methyletheylketone peroxide can be used. In the case where the base polymer is a polyurethane, tin compounds can be used as the polymerization catalyst.

In case (i), in which a polyorganosiloxane of the present invention is copolymerized with a monomer providing a base polymer to obtain a copolymer resin of the present invention, the base polymer includes various polymers as enumerated above, and preferably a vinyl polymer.

The proportion of the polyorganosiloxane to the base polymer (polyorganosiloxane/base polymer) in the copolymer resin of the present invention is preferably 0.5/99.5 to 50/50, more preferably from 1/99 to 30/70, by weight.

The following explanation is chiefly directed to the case where a base polymer is a vinyl polymer, but the present invention is not construed as being limited thereto.

The vinyl polymer having a polymethylsilsesquioxane structure, one example of the copolymer resins according to the present invention, comprises a vinyl polymer to which the polyorganosiloxane of the present invention is bonded via the vinyl group (reactive group) of the vinyl polymer such a vinyl polymer is excellent in storage preservability as well as durability.

Bonding of the polyorganosiloxane of the present invention to the main chain and/or side chain of a vinyl polymer can be achieved by copolymerizing the polyorganosiloxane of the present invention and a vinyl monomer providing the vinyl base polymer. The polyorganosiloxane in this case should have an organic polymerizable group, such as a vinyl group, an acrylic group, a methacrylic group, and an alkenyl group, as the reactive group.

While not limiting, the vinyl monomer which can be copolymerized with the polyorganosiloxane includes esters between acrylic or methacrylic acid and a monohydric alcohol having from 1 to 22 carbon atoms (such as methyl acrylate, methyl methacrylate, ethyl acrylate, ethyl methacrylate, propyl acrylate, propyl methacrylate, butyl acrylate, butyl methacrylate, 2-ethylhexyl acrylate, 2-ethylhexyl methacrylate, lauryl acrylate, lauryl methacrylate, stearyl acrylate, and stearyl methacrylate), styrene, vinyltoluene, α-methylstyrene, acrylonitrile, vinyl acetate, and vinyl chloride.

The copolymerization reaction is preferably carried out in a conventional manner, for example in the presence of a polymerization initiator, such as an organic peroxide or a catalyst for polymerization. For example, where a base polymer is prepared by radical polymerization of a vinyl monomer, a polymerization initiator, such as benzoyl peroxide, methyl ethyl ketone peroxide, cumene hydroperoxide or t-butyl hydroperoxide, or azobisisobutyronitrile can be used, but the polymerization initiator to be used is not limited to these. The reaction is preferably conducted in an organic solvent, such as xylene, toluene, butyl acetate, or methyl isobutyl ketone.

The thus obtained vinyl copolymer preferably has a number average molecular weight of from 1,000 to 300,000, still preferably from 3,000 to 100,000.

The vinyl copolymer resin prepared according to case (i), as one embodiment of the copolymer resin of the present invention, further comprises a polymethylsilsesquioxane structure which is prepared by copolymerizing the polyorganosiloxane and the above-mentioned vinyl monomer a part of which is replaced with a vinyl monomer having a crosslinking reactive group. The crosslinking reactive group-containing vinyl copolymer resin is suited as a resin of a resin composition which can be subjected to three-dimensional crosslink curing as hereinafter described. Such a vinyl copolymer can be obtained by, for example, applying the above-mentioned copolymerization reaction to a vinyl monomer having a crosslinking reactive group.

Examples of the vinyl monomers having a crosslinking reactive group, which may be used as part of the vinyl monomer, include alcoholic hydroxyl-containing vinyl monomers, such as hydroxyethyl acrylate, hydroxyethyl methacrylate, hydroxypropyl acrylate, and hydroxypropyl methacrylate; carboxyl-containing vinyl monomers, such as acrylic acid, methacrylic acid, itaconic acid, and maleic anhydride; epoxy-containing vinyl monomers, such as glycidyl acrylate and glycidyl methacrylate; amido-containing vinyl monomers, such as acrylamide, methacrylamide, N-methylolamide, and N-methylolmethacrylamide; amine type vinyl monomers, such as dimethylaminoethyl methacrylate, 2-diethylaminoethyl methacrylate, and t-butylaminoethyl methacrylate; sulfo- or chlorosulfo-containing vinyl monomers, such as vinylsulfonyl chloride; and vinyl monomers containing other crosslinking reactive groups, such as a mercapto group, an amidoxime group, an aldehyde group or an acetylacetonato group. Among these, hydroxypropyl acrylate, hydroxypropyl methacrylate, acrylic acid, methacrylic acid, maleic anhydride, and glycidyl methacrylate are preferred.

The copolymer resin resulting from copolymerization of the polyorganosiloxane and a vinyl monomer containing a crosslinking reactive group-containing vinyl monomer has a number average molecular weight of from 1,000 to 300,000, preferably from 3,000 to 100,000.

Among the copolymer resins according to the present invention, preferred is (i-1) a copolymer resin obtained by copolymerizing (a) the polyorganosiloxane of the present invention, (b) a polydialkylsiloxane having at least one ethylenic polymerizable group per molecule, and (c) an ethylenic monomer. This preferred copolymer resin (i-1) preferably has a number average molecular weight of from 5,000 to 300,000.

Polyorganosiloxane (a) and polydialkylsiloxane (b) in copolymer resin (i-1) each preferably have a number average molecular weight (Mn) of from about 500 to 10,000 as measured by GPC. It is also preferable that each of these units has a narrow molecular weight distribution as having a weight average molecular weight to number average molecular weight ratio (Mw/Mn) of from 1 to 3. As the molecular weight distribution becomes broader, copolymer molecules that have a high molecular weight become more polyfunctional than necessary and thereby liable to gelation on vinyl copolymerization.

The number of vinyl groups per molecule of polyorganosiloxane (a) or polydialkylsiloxane (b) in copolymer resin (i-1) is preferably 1 to 2. If it is 2 or more, the system of vinyl copolymerization tends to undergo gelation. If it is less than 1, the proportion of those units that are not incorporated into the vinyl polymer on vinyl copolymerization increases, unavoidably leading to disadvantages.

Examples of the polydialkylsiloxane (b) having at least one ethylenic polymerizable group per molecule include a modified polydimethylsiloxane having a methacryl group at one end thereof.

If desired, polydialkylsiloxane (b) may be prepared by a polymer reaction. For instance, hydroxyl-terminated polydimethylsiloxane can be reacted with an unsaturated isocyanate, e.g., isocyanato ethylmethacrylate.

The copolymer resin (i-1) obtained by copolymerizing the polydialkylsiloxane (b) having at least one ethylenic polymerizable group per molecule can form a coated film that has excellent stain resistance. For example, the coated film repels an oily ink and therefore cannot be marked with an oily felt tipped pen.

Examples of the reactive group present in part of polyorganosiloxane (a) and/or polydialkylsiloxane (b) include a vinyl group, an alkenyl group, an epoxy group, an amino group, a mercapto group, an alcoholic hydroxyl group, a carboxyl group, an amido group, an amidoxime group, a sulfo group, a chlorosulfo group, an aldehyde group, an acetylacetonato group, and a combination of two or more thereof. The polyorganosiloxane or polydialkylsiloxane containing such a reactive group can be prepared directly by hydrolytic condensation of a corresponding trialkoxysilane and a methyltrialkoxysilane, etc. or through a polymer reaction using a polyorganosiloxane or polydialkylcyclohexane having a different reactive group.

Specific but non-limiting examples of ethylenic monomer (c) which can be copolymerized with polyorganosiloxane (a) and/or polydialkylsiloxane (b) include esters between acrylic or methacrylic acid and a monohydric alcohol having from 1 to 22 carbon atoms (such as methyl acrylate, methyl methacrylate, ethyl acrylate, ethyl methacrylate, propyl acrylate, propyl methacrylate, butyl acrylate, butyl methacrylate, 2-ethylhexyl acrylate, 2-ethylhexyl methacrylate, lauryl acrylate, lauryl methacrylate, stearyl acrylate, and stearyl methacrylate), styrene, vinyltoluene, α-methylstyrene, acrylonitrile, vinyl acetate, and vinyl chloride.

Examples of the crosslinking reactive group-containing vinyl monomer which can be used as part of ethylenic monomer (c) include alcoholic hydroxyl-containing vinyl monomers, such as 2-hydroxyethyl acrylate, 2-hydroxyethyl methacrylate, 3-hydroxypropyl acrylate, and 3-hydroxypropyl methacrylate; carboxyl-containing vinyl monomers, such as acrylic acid, methacrylic acid, itaconic acid, and maleic anhydride; epoxy-containing vinyl monomers, such as glycidyl acrylate and glycidyl methacrylate; amido-containing vinyl monomers, such as acrylamide, methacrylamide, N-methylolamide, and N-methylolmethacrylamide; amine type vinyl monomers, such as dimethylaminoethyl methacrylate, 2-diethylaminoethyl methacrylate, and t-butylaminoethyl methacrylate; sulfo- or chlorosulfo-containing vinyl monomers, such as vinylsulfonyl chloride; and vinyl monomers containing a mercapto group, an amidoxime group, an aldehyde group or an acetylacetonato group.

The method for preparing copolymer resin (i-1) is not particularly limited. For example, polyorganosiloxane having a methacryl group, polydimethylsiloxane having a methacryl group at one end thereof, and a vinyl monomer (e.g., acrylic esters) are dissolved in a solvent such as butyl acetate, and copolymerization is conducted by using a polymerization initiator such as organic peroxides or azo compounds, to produce the copolymer resin.

Copolymer resin (i-1) having the polyorganosilsesquioxane structural unit and polydialkylsiloxane structural unit can serve alone as a resin with excellent hardness and durability. It is also formulated into a resin composition together with curing agents, extenders, thickeners, pigments, ultraviolet absorbers, antioxidants, defoamers, and the like.

Copolymer resin (i-1) preferably has a number average molecular weight (Mn) of from 5,000 to 300,000 as measured by GPC. Those having too low or too high an Mn are often unfavorable.

Where the above-described vinyl copolymer resin (i-1) comprising the two kinds of polysiloxane structural units contains crosslinking reactive groups, the copolymer resin or a resin composition containing the same may be subjected to three-dimensional crosslink curing depending on the purpose and end use.

Another preferred example of the copolymer resin according to case (i) obtained by copolymerizing the polyorganosiloxane of the present invention and a polymerizable monomer is (i-2) a copolymer resin obtained by copolymerizing the polyorganosiloxane of the present invention, in which the reactive group (copolymerizable with a polymerizable monomer or reactive with a polymer) is a 3-methacryloxypropyl group, and acrylic or methacrylic acid or an ester thereof in the presence of a radical initiator.

The polyorganosiloxane of the present invention containing a 3-methacryloxypropyl group can be produced from a starting polyorganosiloxane containing a 3-methacryloxypropyl group, which can be obtained by hydrolytic condensation of a trialkoxysilane containing 3-methacryloxylpropyltrialkoxysilane. 3-Methacryloxypropyltrialkoxysilane can be industrially prepared with reactive ease and is advantageously used in the present invention.

In case (ii), in which the copolymer resin according to the present invention is obtained by reacting the polyorganosiloxane of the present invention and a base polymer having a reactive group, the base polymer to be reacted with the polyorganosiloxane of the present invention should have, at the terminals and/or side chains thereof, a reactive group capable of reacting with the reactive group of the polyorganosiloxane to form a conjugated bond. A base polymer having such a reactive group can be obtained by subjecting a polymer with no reactive group, e.g., polyolefin, to a polymer reaction to introduce a desired reactive group, or by copolymerizing a monomer previously having a desired reactive group.

The proportion of the polyorganosiloxane and the base polymer is not particularly limited and may the similar ranges as in the copolymer resins according to case (i).

The reaction of the polyorganosiloxane with a reactive group-containing base polymer is preferably carried out in an organic solvent, such as xylene, toluene, butyl acetate, and methyl isobutyl ketone.

The reaction conditions are not critical and can be appropriately selected depending on the kind and amount of the reactive group, the kind of the base polymer and the like.

Where the polyorganosiloxane contains reactive groups of one kind, all the reactive groups do not need to react with the reactive groups of the base polymer.

The copolymer resin having the polymethylsilsesquioxane structure according to the present invention can serve alone as a resin with excellent hardness and durability. It is also formulated into a resin composition together with curing agents, extenders, thickeners, pigments, ultraviolet absorbers, antioxidants, defoamers, and the like.

The above-described copolymer resin or a resin composition containing the same may be combined on use with various solvents or reactive diluents. Examples of the solvents include alcohols, e.g., propanol and butanol; ketones, e.g., methyl ethyl ketone and methyl isobutyl ketone; ethers, e.g., cellosolve acetate and methyl cellosolve; esters, e.g., ethyl acetate and butyl acetate; aromatic hydrocarbons, e.g., toluene and xylene; and mixtures of two or more thereof.

The copolymer resin having the polymethylsilsesquioxane structure according to the present invention or a composition containing the same is useful as a molding material or a sheeting material and, in particular, more useful as a base resin for coating compositions for various articles, vehicles, buildings, etc. The copolymer resin by itself can be used as a coating resin excellent in hardness, durability, etc., and can used as a coating composition by adding curing agents, extenders, thickeners, pigments, ultraviolet absorbents, antioxidants, defoamers, and the like. The coating composition may be diluted with an organic solvent if desired.

In the applications of the coating composition, suitable methods and conditions for three-dimensional crosslink curing are to be selected according to the kind of the crosslinking reactive group and the kind of a curing agent. When the copolymer resin used has an alcoholic hydroxyl group as a reactive group, and a polyfunctional isocyanate compound (e.g., trimer of isocyanate) is used as a curing agent, a two component room temperature curing or heat curing system can be used, for example, the copolymer resin and the isocyanate curing agent are mixed in such a manner that the molar amounts of the hydroxyl group and the isocyanate group becomes equal. When a melamine resin is used as a curing agent, a heat curing system can be used, for example the copolymer resin is mixed with a melamine compound (e.g., methylated methylolmelamine or butylated methylolmelamine) and a curing catalyst (e.g., ammonium para-toluenesulfonate), and then heated to a temperature, e.g., 150° to 250° C., to effect heat curing. When the reactive group in the polyorganosiloxane is a carboxyl group, an epoxy compound, such as two- or three-functional epoxy compounds and glycidylmethacrylate copolymers, can be used as a curing agent, and the curing reaction may be conducted under conventional conditions.

The present invention will now be illustrated in greater detail with reference to Synthesis Examples and Examples, but it should be understood that the present invention is not construed as being limited thereto. All the parts and percents are by weight unless otherwise indicated.

Measurement of properties of a cured film obtained was made as follows.

1) Surface Hardness

Measured with a pencil hardness tester in accordance with JIS K5401.

2) Weather Resistance

A sunshine carbon arc weather-o-meter test was conducted in accordance with JIS B7753. Weather resistance was evaluated by comparing the surface of a test specimen before exposure and that after exposure for 2,000 hours.

EXAMPLE 1

A methacryl-reactive polyorganosiloxane was synthesized.

In a 300 mL three-neck flask, fitted with a condenser capped with a gas outlet, a mechanical stirrer, a thermometer and a nitrogen gas inlet under flowing nitrogen atmosphere, were added 39.5 mmol of 3-methacryloxypropyltrimethoxysilane (9.8 g), 434 mmol of methyltriethoxysilane (77.4 g), 12.2 mmol of phenyltrimethoxysilane (2.42 g) and 1,460 mmol of water (26.3 g), and the mixture was cooled to 5° C. After 5 g of 3.6% aqueous HCl solution (4.9 mmol of HCl) was added to the mixture over 30 minutes, the mixture was kept at 10° C. for 1 hour. The reaction temperature was maintained at 70° C. by controlling the temperature of the reaction vessel in a water bath. The hydrolytic condensation reaction was conducted in flowing nitrogen atmosphere for 3 hours and after which the silylating reaction was conducted for 3 hours by adding 77.6 mmol of hexamethyldisiloxane (12.6 g). The resulting solution was cooled to 40° C. A 5% methanol solution of KOH (5.5 g, 4.9 mmol) was added to the solution and the mixture was kept overnight at room temperature. The mixture was separated into two layers, and the bottom layer was separated. Butylacetate was added to the bottom layer and the mixture was evaporated under 200 mmHg at 40° C. to remove 80 g of solvent. The resulting solution was stirred for 1 hour after addition of butylacetate (170 g). A colorless transparent solution (210 g) was obtained after filtration through a 0.8 µ-filter and found to have a number average molecular weight of 3,470. This polymer was designated polymer A. The total number of hydroxyl and/or alkoxy groups in the side chain and/or terminal might be 0.8 judging from the each peak detected with $^1$H, $^{13}$C and $^{29}$Si-nmr and the molar ratio of 3-methacryloxypropyl group, methyl group and phenyl group in the side chain of the resulting polyorganosiloxane was 3/36/1, which corresponded to the molar ratio of the starting monomers charged.

EXAMPLE 2

A methacryl-reactive polyorganosiloxane was synthesized in the similar manner as in Example 1, where the composition of the group represented by R was changed.

In a 300 mL three-neck flask, fitted with a condenser capped with a gas outlet, a mechanical stirrer, a thermometer and a nitrogen gas inlet under flowing nitrogen atmosphere, were added 19.7 mmol of 3-methacryloxypropyltrimethoxysilane (4.90 g), 326 mmol of methyltriethoxysilane (58.1 g), 6.1 mmol of phenyltrimethoxysilane (1.21 g) and 1,055 mmol of water (19.0 g), and the mixture was cooled to 5° C. After 3.6 g of 3.6% aqueous HCl solution (3.6 mmol of HCl) was added to the mixture over 30 minutes, the mixture was kept at 10° C. for 1 hour. The reaction temperature was maintained at 70° C. by controlling the temperature of the reaction vessel in a water bath. The hydrolytic condensation reaction was conducted in flowing nitrogen atmosphere for 3 hours and after which the silylating reaction was conducted for 3 hours by adding 56.0 mmol of hexamethyldisiloxane (9.1 g). The resulting solution was cooled to 40° C. A 5% methanol solution of KOH (3.9 g, 3.5 mmol) was added to the solution and the mixture was kept overnight at room temperature. The mixture was separated into two layers, and the bottom layer was separated. Butylacetate was added to the bottom layer and the mixture was evaporated under 200 mmHg at 40° C. to remove 70 g of solvent. The resulting solution was stirred for 1 hour after addition of butylacetate (170 g). A colorless transparent solution (200 g) was obtained after filtration through a 0.8 µ-filter and found to have a number average molecular weight of 3,200. The total number of hydroxyl and/or alkoxy groups in the side chain and/or terminal might be 0.8 judging from the each peak detected with $^1$H, $^{13}$C and $^{29}$Si-nmr and the molar ratio of 3-methacryloxypropyl group, methyl group and phenyl group in the side chain of the resulting polyorganosiloxane was 3/53/1, which corresponded to the molar ratio of the starting monomers charged.

EXAMPLE 3

A methacryl-reactive polyorganosiloxane was synthesized in the similar manner as in Example 1, where the total number of hydroxyl and/or alkoxy group in the side chain and/or terminal was changed.

In a 300 mL three-neck flask, fitted with a condenser capped with a gas outlet, a mechanical stirrer, a thermometer and a nitrogen gas inlet under flowing nitrogen atmosphere, were added 39.5 mmol of 3-methacryloxypropyltrimethoxysilane (9.8 g), 434 mmol of methyltriethoxysilane (77.4 g), 12.2 mmol of phenyltrimethoxysilane (2.42 g) and 1,460 mmol of water (26.3 g), and the mixture was cooled to 5° C. After 5 g of 3.6% aqueous HCl solution (4.9 mmol of HCl) was added to the mixture over 30 minutes, the mixture was kept at 10° C. for 1 hour. The reaction temperature was maintained at 70° C. by controlling the temperature of the reaction vessel in a water bath. The hydrolytic condensation reaction was conducted in flowing nitrogen atmosphere for 3 hours and after which the silylating reaction was conducted for 3 hours by adding 38.2 mmol of hexamethyldisiloxane (6.2 g). The resulting solution was cooled to 40° C. A 5% methanol solution of KOH (5.5 g, 4.9 mmol) was added to the solution and the mixture was kept overnight at room temperature. The mixture was separated into two layers, and the bottom layer was separated. Butylacetate was added to the bottom layer and the mixture was evaporated under 200 mmHg at 40° C. to remove 80 g of solvent. The resulting solution was stirred for 1 hour after addition of butylacetate (170 g). A colorless transparent solution (205 g) was obtained after filtration through a 0.8 µ-filter and found to have a number average molecular weight of 3,300. The total number of hydroxyl and/or alkoxy groups in the side chain and/or terminal might be 1.6 judging from the each peak detected with $^1$H, $^{13}$C and $^{29}$Si-nmr and the molar ratio of 3-methacryloxypropyl group, methyl group and phenyl group in the side chain of the resulting polyorganosiloxane was 3/36/1, which corresponded to the molar ratio of the starting monomers charged.

EXAMPLE 4

A mercapto-reactive polyorganosiloxane was synthesized in the similar manner as in Example 1.

In a 300 mL three-neck flask, fitted with a condenser capped with a gas outlet, a mechanical stirrer, a thermometer and a nitrogen gas inlet under flowing nitrogen atmosphere, were added 39.2 mmol of 3-mercaptoxypropyltrimethoxysilane (7.7 g), 434 mmol of methyltriethoxysilane (77.4 g), 12.2 mmol of phenyltrimethoxysilane (2.42 g) and 1,460 mmol of water (26.3 g), and the mixture was cooled to 5° C. After 5 g of 3.6% aqueous HCl solution (4.9 mmol of HCl) was added to the mixture over 30 minutes, the mixture was kept at 10° C. for 1 hour. The reaction temperature was maintained at 70° C. by controlling the temperature of the reaction vessel in a water bath. The hydrolytic condensation reaction was conducted in flowing nitrogen atmosphere for 3 hours and after which the silylating reaction was conducted for 3 hours by adding 118 mmol of hexamethyldisiloxane (19.1 g). The resulting solution was cooled to 40° C. A 5% methanol solution of KOH (5.5 g, 4.9 mmol) was added to the solution and the mixture was kept overnight at room temperature. The mixture was separated into two layers, and the bottom layer was separated. Butylacetate was added to the bottom layer and the mixture was evaporated under 200 mmHg at 40° C. to remove 80 g of solvent. The resulting solution was stirred for 1 hour after addition of butylacetate (170 g). A colorless transparent solution (206 g) was obtained after filtration through a 0.8 µ-filter and found to have a number average molecular weight of 3,400. This polymer was designated polymer B. The total number of hydroxyl and/or alkoxy groups in the side chain and/or terminal might be 0.8 judging from the each peak detected with $^1$H, $^{13}$C and $^{29}$Si-nmr and the molar ratio of 3-mercaptoxypropyl group, methyl group and phenyl group in the side chain of the resulting polyorganosiloxane was 3/36/1, which corresponded to the molar ratio of the starting monomers charged.

EXAMPLE 5

A vinyl-reactive polyorganosiloxane was synthesized in the similar manner as in Example 1.

In a 300 mL three-neck flask, fitted with a condenser capped with a gas outlet, a mechanical stirrer, a thermometer and a nitrogen gas inlet under flowing nitrogen atmosphere, were added 39.5 mmol of 3-vinyltrimethoxysilane (5.86 g), 434 mmol of methyltriethoxysilane (77.4 g), 12.2 mmol of phenyltrimethoxysilane (2.42 g) and 1,460 mmol of water (26.3 g), and the mixture was cooled to 5° C. After 5 g of 3.6% aqueous HCl solution (4.9 mmol of HCl) was added to the mixture over 30 minutes, the mixture was kept at 10° C. for 1 hour. The reaction temperature was maintained at 70° C. by controlling the temperature of the reaction vessel in a water bath. The hydrolytic condensation reaction was conducted in flowing nitrogen atmosphere for 3 hours and after which the silylating reaction was conducted for 3 hours by adding 118 mmol of hexamethyldisiloxane (19.1 g). The resulting solution was cooled to 40° C. A 5% methanol solution of KOH (5.5 g, 4.9 mmol) was added to the solution and the mixture was kept overnight at room temperature. The mixture was separated into two layers, and the bottom layer was separated. Butylacetate was added to the bottom layer and the mixture was evaporated under 200 mmHg at 40° C. to remove 80 g of solvent. The resulting solution was stirred for 1 hour after addition of butylacetate (170 g). A colorless transparent solution (202 g) was obtained after filtration through a 0.8 µ-filter and found to have a number average molecular weight of 3,500. This polymer was designated polymer C. The total number of hydroxyl and/or alkoxy groups in the side chain and/or terminal might be 0.8 judging from the each peak detected with $^1$H, $^{13}$C and $^{29}$Si-nmr and the molar ratio of vinyl group, methyl group and phenyl group in the side chain of the resulting polyorganosiloxane was 3/36/1, which corresponded to the molar ratio of the starting monomers charged.

EXAMPLE 6

A epoxy-reactive polyorganosiloxane was synthesized in the similar manner as in Example 1.

In a 300 mL three-neck flask, fitted with a condenser capped with a gas outlet, a mechanical stirrer, a thermometer and a nitrogen gas inlet under flowing nitrogen atmosphere, were added 39.5 mmol of 3-glycidoxypropyltrimethoxysilane (9.33 g), 434 mmol of methyltriethoxysilane (77.4 g), 12.2 mmol of phenyltrimethoxysilane (2.42 g) and 1,460 mmol of water (26.3 g), and the mixture was cooled to 5° C. After 5 g of 3.6% aqueous HCl solution (4.9 mmol of HCl) was added to the mixture over 30 minutes, the mixture was kept at 10° C. for 1 hour. The reaction temperature was maintained at 70° C. by controlling the temperature of the reaction vessel in a water bath. The hydrolytic condensation reaction was conducted in flowing nitrogen atmosphere for 3 hours and after which the silylating reaction was conducted for 3 hours by adding 118 mmol of hexamethyldisiloxane (19.1 g). The resulting solution was cooled to 40° C. A 5% methanol solution of KOH (5.5 g, 4.9 mmol) was added to the solution and the mixture was kept overnight at room temperature. The mixture was separated into two layers, and the bottom layer was separated. Butylacetate was added to the bottom layer and the mixture was evaporated under 200 mmHg at 40° C. to remove 80 g of solvent. The resulting solution was stirred for 1 hour after addition of butylacetate (170 g). A colorless transparent solution (207 g) was obtained after filtration through a 0.8 μ-filter and found to have a number average molecular weight of 3,470. This polymer was designated polymer D. The total number of hydroxyl and/or alkoxy groups in the side chain and/or terminal might be 0.8 judging from the each peak detected with $^1H$, $^{13}C$ and $^{29}Si$-nmr and the molar ratio of 3-glycidoxypropyl group, methyl group and phenyl group in the side chain of the resulting polyorganosiloxane was 3/36/1, which corresponded to the molar ratio of the starting monomers charged.

EXAMPLE 7

A methacryl-reactive polyorganosiloxane was synthesized in the similar manner as in Example 1, where the end cap group was changed.

In a 300 mL three-neck flask, fitted with a condenser capped with a gas outlet, a mechanical stirrer, a thermometer and a nitrogen gas inlet under flowing nitrogen atmosphere, were added 39.5 mmol of 3-methacryloxypropyltrimethoxysilane (9.8 g), 434 mmol of methyltriethoxysilane (77.4 g), 12.2 mmol of phenyltrimethoxysilane (2.42 g) and 1,460 mmol of water (26.3 g), and the mixture was cooled to 5° C. After 5 g of 3.6% aqueous HCl solution (4.9 mmol of HCl) was added to the mixture over 30 minutes, the mixture was kept at 10° C. for 1 hour. The reaction temperature was maintained at 70° C. by controlling the temperature of the reaction vessel in a water bath. The hydrolytic condensation reaction was conducted in flowing nitrogen atmosphere for 3 hours and after which the silylating reaction was conducted for 3 hours by adding 77.5 mmol of hexaethyldisiloxane (19.1 g). The resulting solution was cooled to 40° C. A 5% methanol solution of KOH (5.5 g, 4.9 mmol) was added to the solution and the mixture was kept overnight at room temperature. The mixture was separated into two layers, and the bottom layer was separated. Butylacetate was added to the bottom layer and the mixture was evaporated under 200 mmHg at 40° C. to remove 80 g of solvent. The resulting solution was stirred for 1 hour after addition of butylacetate (170 g). A colorless transparent solution (215 g) was obtained after filtration through a 0.8 μ-filter and found to have a number average molecular weight of 3,470. The total number of hydroxyl and/or alkoxy groups in the side chain and/or terminal might be 0.8 judging from the each peak detected with $^1H$, $^{13}C$ and $^{29}Si$-nmr and the molar ratio of 3-methacryloxypropyl group, methyl group and phenyl group in the side chain of the resulting polyorganosiloxane was 3/36/1, which corresponded to the molar ratio of the starting monomers charged.

EXAMPLE 8

A methacryl-reactive polyorganosiloxane was synthesized in the similar manner as in Example 1, where the end cap group was changed.

In a 300 mL three-neck flask, fitted with a condenser capped with a gas outlet, a mechanical stirrer, a thermometer and a nitrogen gas inlet under flowing nitrogen atmosphere, were added 39.5 mmol of 3-methacryloxypropyltrimethoxysilane (9.8 g), 434 mmol of methyltriethoxysilane (77.4 g), 12.2 mmol of phenyltrimethoxysilane (2.42 g) and 1,460 mmol of water (26.3 g), and the mixture was cooled to 5° C. After 5 g of 3.6% aqueous HCl solution (4.9 mmol of HCl) was added to the mixture over 30 minutes, the mixture was kept at 10° C. for 1 hour. The reaction temperature was maintained at 70° C. by controlling the temperature of the reaction vessel in a water bath. The hydrolytic condensation reaction was conducted in flowing nitrogen atmosphere for 3 hours and after which the silylating reaction was conducted for 3 hours by adding 155.2 mmol of trimethylsilanol (14.0 g). The resulting solution was cooled to 40° C. A 5% methanol solution of KOH (5.5 g, 4.9 mmol) was added to the solution and the mixture was kept overnight at room temperature. The mixture was separated into two layers, and the bottom layer was separated. Butylacetate was added to the bottom layer and the mixture was evaporated under 200 mmHg at 40° C. to remove 80 g of solvent. The resulting solution was stirred for 1 hour after addition of butylacetate (170 g). A colorless transparent solution (209 g) was obtained after filtration through a 0.8 μ-filter and found to have a number average molecular weight of 3,400. The total number of hydroxyl and/or alkoxy groups in the side chain and/or terminal might be 0.8 judging from the each peak detected with $^1H$, $^{13}C$ and $^{29}Si$-nmr and the molar ratio of 3-methacryloxypropyl group, methyl group and phenyl group in the side chain of the resulting polyorganosiloxane was 3/36/1, which corresponded to the molar ratio of the starting monomers charged.

EXAMPLE 9

A methacryl-reactive polyorganosiloxane was synthesized in the similar manner as in Example 1, where the amount of water in the hydrolytic condensation reaction was changed.

In a 300 mL three-neck flask, fitted with a condenser capped with a gas outlet, a mechanical stirrer, a thermometer and a nitrogen gas inlet under flowing nitrogen atmosphere, were added 39.5 mmol of 3-methacryloxypropyltrimethoxysilane (9.8 g), 434 mmol of methyltriethoxysilane (77.4 g), 12.2 mmol of phenyltrimethoxysilane (2.42 g) and 1,216 mmol of water (21.9 g), and the mixture was cooled to 5° C. After 5 g of 3.6% aqueous HCl solution (4.9 mmol of HCl) was added to the mixture over 30 minutes, the mixture was kept at 10° C. for 1 hour. The reaction temperature was maintained at 70° C. by controlling the temperature of the reaction vessel in a water bath. The hydrolytic condensation reaction was conducted in flowing nitrogen atmosphere for 3 hours and after which the silylating reaction was conducted for 3 hours by adding 77.6 mmol of hexamethyldisiloxane (12.6 g). The resulting solution was cooled to 40° C. A 5% methanol solution of KOH (5.5 g, 4.9 mmol) was added to the solution and the mixture was kept overnight at room temperature. The mixture was separated into two layers, and the bottom layer was separated. Butylacetate was added to the bottom layer and the mixture was evaporated under 200 mmHg at 40° C. to remove 80 g of solvent. The resulting solution was stirred for 1 hour after addition of butylacetate (170 g). A colorless transparent solution (210 g) was obtained after filtration through a 0.8 μ-filter and found to have a number average molecular weight of 3,000. The total number of hydroxyl and/or alkoxy groups in the side chain and/or terminal might be 0.8 judging from the each peak detected with $^1H$, $^{13}C$ and $^{29}Si$-nmr and the molar ratio of 3-methacryloxypropyl group, methyl group and phenyl group in the side chain of the resulting polyorganosiloxane was 3/36/1, which corresponded to the molar ratio of the starting monomers charged.

EXAMPLE 10

A methacryl-reactive polyorganosiloxane was synthesized in the similar manner as in Example 1, where the amount of an acid in the hydrolytic condensation reaction was changed.

In a 300 mL three-neck flask, fitted with a condenser capped with a gas outlet,-a mechanical stirrer, a thermometer and a nitrogen gas inlet under flowing nitrogen atmosphere, were added 39.5 mmol of 3-methacryloxypropyltrimethoxysilane (9.8 g), 434 mmol of methyltriethoxysilane (77.4 g), 12.2 mmol of phenyltrimethoxysilane (2.42 g) and 1,460 mmol of water (26.3 g), and the mixture was cooled to 5° C. After 5.4 g of 9.9% aqueous HCl solution (14.7 mmol of HCl) was added to the mixture over 30 minutes, the mixture was kept at 10° C. for 1 hour. The reaction temperature was maintained at 70° C. by controlling the temperature of the reaction vessel in a water bath. The hydrolytic condensation reaction was conducted in flowing nitrogen atmosphere for 3 hours and after which the silylating reaction was conducted for 3 hours by adding 77.6 mmol of hexamethyldisiloxane (12.6 g). The resulting solution was cooled to 40° C. A 5% methanol solution of KOH (16.4 g, 14.6 mmol) was added to the solution and the mixture was kept overnight at room temperature. The mixture was separated into two layers, and the bottom layer was separated. Butylacetate was added to the bottom layer and the mixture was evaporated under 200 mmHg at 40° C. to remove 80 g of solvent. The resulting solution was stirred for 1 hour after addition of butylacetate (170 g). A colorless transparent solution (210 g) was obtained after filtration through a 0.8 μ-filter and found to have a number average molecular weight of 3,100. The total number of hydroxyl and/or alkoxy groups in the side chain and/or terminal might be 0.8 judging from the each peak detected with $^1H$, $^{13}C$ and $^{29}Si$-nmr and the molar ratio of 3-methacryloxypropyl group, methyl group and phenyl group in the side chain of the resulting polyorganosiloxane was 3/36/1, which corresponded to the molar ratio of the starting monomers charged.

EXAMPLE 11

A copolymer resin was produced by copolymerizing the methacryl-reactive polyorganosiloxane.

In a 200 mL flask fitted with a thermometer, a mechanical stirrer and a reflux condenser, were added 120 g of a carbinol-modified polydimethylsiloxane having a molecular weight of 3,400 (KF-6002 manufactured by Shin-Etsu Chemical Industries, Ltd.) and 139 mg of dibutyl tin dilaurate, and the mixture was stirred at 15° C. After slowly adding 9.0 g of 2-isocyanate ethyl methacrylate thereto over 20 minutes, the temperature of the reaction mixture was increased to 40° C. and maintained at that temperature for 1.5 hours to conduct the reaction. After cooling to room temperature, 127 g of a silicone macromer was obtained.

In a 300 mL flask fitted with a thermometer, a mechanical stirrer, a nitrogen gas inlet and a reflux condenser, were added a solution of 24.5 g of polymer A, 1.36 g of the silicone macromer obtained above, 33.7 g of 2-hydroxyethyl methacrylate, 17.3 g of methyl methacrylate, 49.1 g of n-butyl methacrylate, 15.9 g of 2-ethylhexyl acrylate, 2.18 g of acrylic acid and 2.44 g of dodecylmercaptane, and the mixture was stirred for 30 minutes in flowing nitrogen atmosphere to obtain a monomer mixture.

In a 300 mL flask fitted with a thermometer, a mechanical stirrer, a nitrogen gas inlet and a reflux condenser, were added 26.6 g of the monomer mixture obtained above and 55.0 g of butyl acetate, and the mixture was stirred for 30 minutes at room temperature in flowing nitrogen atmosphere. After adding 23.9 g of a 3.8% butyl acetate solution of dimethyl 2,2'-azobis(2-methylpropionate) to the mixture, the temperature of the mixture was increased to 80° C. and maintained at that temperature for 30 minutes in flowing nitrogen gas atmosphere. 106 g of the monomer mixture was then further added to the reaction mixture over 3 hours. 20.7 g of a 2.2% butyl acetate solution of dimethyl 2,2'-azobis(2-methylpropionate) was then further added to the reaction mixture, and the reaction was conducted for 3 hours at 90° C. After cooling to room temperature, 220 g of a colorless transparent solution was obtained after filtration through a 0.8 μ-filter and found to have a weight average molecular weight of 25,000. This polymer was designated polymer E.

EXAMPLE 12

A copolymer resin was produced by copolymerizing the methoxy-reactive polyorganosiloxane using no silicone macromer.

In a 300 mL flask fitted with a thermometer, a mechanical stirrer, a nitrogen gas inlet and a reflux condenser, were added a solution of 24.5 g of polymer A, 33.7 g of 2-hydroxyethyl methacrylate, 17.3 g of methyl methacrylate, 49.1 g of n-butyl methacrylate, 15.9 g of 2-ethylhexyl acrylate, 2.18 g of acrylic acid and 2.44 g of dodecylmercaptane, and the mixture was stirred for 30 minutes in flowing nitrogen atmosphere to obtain a monomer mixture.

In a 300 mL flask fitted with a thermometer, a mechanical stirrer, a nitrogen gas inlet and a reflux condenser, were added 26.6 g of the monomer mixture obtained above and 55.0 g of butyl acetate, and the mixture was stirred for 30 minutes at room temperature in flowing nitrogen atmosphere. After adding 12.4 g of a 7.9% butyl acetate solution of dimethyl 2,2'-azobis(2-methylpropionate) to the mixture, the temperature of the mixture was increased to 80° C. and maintained at that temperature for 30 minutes in flowing nitrogen gas atmosphere. 106 g of the monomer mixture was then further added to the reaction mixture over 3 hours. 6.4 g of a 7.9% butyl acetate solution of dimethyl 2,2'-azobis(2-methylpropionate) was then further added to the reaction mixture, and the reaction was conducted for 3 hours at 90°

C. After cooling to room temperature, 190 g of a colorless transparent solution was obtained and found to have a weight average molecular weight of 23,000.

EXAMPLE 13

A copolymer resin was produced by copolymerizing the mercapto-reactive polyorganosiloxane.

In a 300 mL flask fitted with a thermometer, a mechanical stirrer, a nitrogen gas inlet and a reflux condenser, were added 70.0 g of the silicone macromer obtained in Example 11, 11.5 g of 2-hydroxyethyl methacrylate, 92.2 g of methyl methacrylate, 57.6 g of iso-butyl methacrylate and 4.61 g of dodecylmercaptane, and the mixture was stirred for 30 minutes in flowing nitrogen atmosphere to obtain a monomer mixture.

In a 1,000 mL flask fitted with a thermometer, a mechanical stirrer, a nitrogen gas inlet and a reflux condenser, were added 36.3 g of the monomer mixture obtained above and 152.3 g of ethyl acetate, and the mixture was stirred for 30 minutes at room temperature in flowing nitrogen atmosphere. After adding 4.2 g of a 7.9% butyl acetate solution of dimethyl 2,2'-azobis(2-methylpropionate) to the mixture, the temperature of the mixture was increased to 70° C. and maintained at that temperature for 30 minutes in flowing nitrogen gas atmosphere. 145.2 g of the monomer mixture was then further added to the reaction mixture over 3 hours, and the reaction was further conducted for 3 hours at 70° C. After the reaction mixture was cooled to 50° C., 0.36 g of dibutyltinlaurilate was added thereto, followed by stirring for 10 minutes, and 10.6 g of 2-isocyanate ethyl methacrylate was further added thereto, followed by being maintained at 50° C. for 2 hours. A solution of 363.1 g of polymer B and 3.46 g of a 10 wt% solution of triethylamine were added thereto and the reaction was further conducted for 3 hours at 70° C. After cooling to room temperature, 735 g of a colorless transparent solution was obtained and found to have a weight average molecular weight of 50,000.

EXAMPLE 14

A copolymer resin was produced by copolymerizing the vinyl-reactive polyorganosiloxane.

In a 300 mL flask fitted with a thermometer, a mechanical stirrer, a nitrogen gas inlet and a reflux condenser, were added a solution of 24.5 g of polymer C, 1.36 g of the silicone macromer obtained in Example 11, 33.7 g of 2-hydroxyethyl methacrylate, 17.3 g of methyl methacrylate, 49.1 g of n-butyl methacrylate, 15.9 g of 2-ethylhexyl acrylate, 2.18 g of acrylic acid and 2.44 g of dodecylmercaptane, and the mixture was stirred for 30 minutes in flowing nitrogen atmosphere to obtain a monomer mixture.

In a 300 mL flask fitted with a thermometer, a mechanical stirrer, a nitrogen gas inlet and a reflux condenser, were added 26.6 g of the monomer mixture obtained above and 55.0 g of butyl acetate, and the mixture was stirred for 30 minutes at room temperature in flowing nitrogen atmosphere. After adding 12.4 g of a 7.9% butyl acetate solution of dimethyl 2,2'-azobis(2-methylpropionate) to the mixture, the temperature of the mixture was increased to 80° C. and maintained at that temperature for 30 minutes in flowing nitrogen gas atmosphere. 106 g of the monomer mixture was then further added to the reaction mixture over 3 hours. 6.4 g of a 7.9% butyl acetate solution of dimethyl 2,2'-azobis(2-methylpropionate) was then added and the reaction was further conducted for 3 hours at 90° C. After cooling to room temperature, 191 g of a colorless transparent solution was obtained and found to have a weight average molecular weight of 26,000.

EXAMPLE 15

A copolymer resin was produced by copolymerizing the epoxy-reactive polyorganosiloxane.

In a 300 mL flask fitted with a thermometer, a mechanical stirrer, a nitrogen gas inlet and a reflux condenser, were added 38.8 g of the silicone macromer obtained in Example 11, 6.4 g of 2-hydroxyethyl methacrylate, 51.1 g of methyl methacrylate, 31.9 g of iso-butyl methacrylate, 26.4 g of methacrylic acid and 3.53 g of dodecylmercaptane, and the mixture was stirred for 30 minutes in flowing nitrogen atmosphere to obtain a monomer mixture.

In a 500 mL flask fitted with a thermometer, a mechanical stirrer, a nitrogen gas inlet and a reflux condenser, were added 26.3 g of the monomer mixture obtained above and 257.0 g of ethyl acetate, and the mixture was stirred for 30 minutes at room temperature in flowing nitrogen atmosphere. After adding 1.8 g of a 7.9% butyl acetate solution of dimethyl 2,2'-azobis(2-methylpropionate) to the mixture, the temperature of the mixture was increased to 70° C. and maintained at that temperature for 30 minutes in flowing nitrogen gas atmosphere. 105.3 g of the monomer mixture was then further added to the reaction mixture over 3 hours, and the reaction was further conducted for 3 hours at 70° C. A solution of 69.1 g of polymer D was then added thereto, followed by conducting the reaction for 3 hours at 70° C. After cooling to room temperature, 460 g of a colorless transparent solution was obtained and found to have a weight average molecular weight of 60,000.

EXAMPLE 16

A coating composition comprising the copolymer resin of the present invention was prepared and coated with crosslinking using an isocyanate compound.

| Coating Composition: | |
| --- | --- |
| Polymer E | 55 parts |
| Polyflunctional aliphatic isocyanate compound (Sumidur N-3500 produced by Sumitomo Bayer Urethane Co., Ltd.) | 12 parts |
| Butyl acetate | 18 parts |
| Xylene | 15 parts |

A slate plate on which a sodium silicate-based spraying material for multilayer patterning had been sprayed and baked was prepared as a substrate. The coating composition was applied onto the substrate to a thickness of 60 μm and cured by heating at 80° C. for 1 hour.

The thickness, surface hardness and weather resistance of the cured film were evaluated. The results obtained are shown in Table 1 below.

EXAMPLE 17

A coating composition comprising the copolymer resin of the present invention was prepared and coated with crosslinking using a melamine compound.

| Coating Composition: | |
| --- | --- |
| Polymer E | 80 parts |
| Polyflunctional aliphatic isocyanate | 15 parts |

-continued

Coating Composition:

| | |
|---|---|
| compound (Desmodur TPLS-2759 produced by Sumitomo Bayer Urethane Co., Ltd.) | |
| Butylolmelamine (UVAN 2061 produced by Mitsui Toatsu Chemicals, Inc.) | 25 parts |
| 3-Methoxy-3-methyl-1-butanol | 87 parts |

A slate plate on which a sodium silicate-based spraying material for multilayer patterning had been sprayed and baked was prepared as a substrate. The coating composition was applied onto the substrate to a thickness of 60 μm and cured by heating at 150° C. for 20 minutes.

The thickness, surface hardness and weather resistance of the cured film were evaluated. The results obtained are shown in Table 1 below.

TABLE 1

| Example No. | Thickness (μm) | Surface hardness | Weather resistance |
|---|---|---|---|
| 16 | 60 | 3H | good |
| 17 | 60 | 2H | good |

COMPARATIVE EXAMPLE 1

In a 500 mL three-neck round bottom flask, fitted with a condenser capped with a gas outlet, a mechanical stirrer, a thermometer and a nitrogen gas inlet under flowing nitrogen atmosphere, were added 39.5 mmol of 3-methacryloxypropyltrimethoxysilane (9.8 g), 434.1 mmol of methyltriethoxysilane (77.4 g), 12.2 mmol of phenyltrimethoxysilane (2.42 g), 1,460 mmol of water (26.3 g) and 120 mL of acetone, and the mixture was cooled to 5° C. After 5 g of 3.6% aqueous HCl solution (4.9 mmol of HCl) was added to the mixture over 30 minutes, the mixture was kept at 10° C. for 1 hour. The reaction temperature was maintained at 70° C. by controlling the temperature of the reaction vessel in a water bath. The reaction mixture was however getting viscous and formed a gel after 3 hours.

COMPARATIVE EXAMPLE 2

In a 500 mL three-neck round bottom flask, fitted with a condenser capped with a gas outlet, a mechanical stirrer, a thermometer and a nitrogen gas inlet under flowing nitrogen atmosphere, were added 243 mmol of 3-methacryloxypropyltrimethoxysilane (60.3 g), 169 mmol of methyltriethoxysilane (34.9 g), 48.6 mmol of phenyltrimethoxysilane (9.64 g) and 1,460 mmol of water (26.3 g), and the mixture was cooled to 5° C. After 5 g of 3.6% aqueous HCl solution (4.9 mmol of HCl) was added to the mixture over 30 minutes, the mixture was kept at 10° C. for 1 hour. The reaction temperature was maintained at 70° C. by controlling the temperature of the reaction vessel in a water bath. The hydrolytic condensation reaction was conducted in flowing nitrogen atmosphere for 3 hours and after which the silylating reaction was conducted for 3 hours by adding 77.6 mmol of hexamethyldisiloxane (12.6 g). The resulting solution was cooled to 40° C. A 5% methanol solution of KOH (5.5 g) was added to the solution and the mixture was kept overnight at room temperature. The mixture was separated into two layers, and the bottom layer was separated. Butylacetate was added to the bottom layer and the mixture was evaporated under 200 mmHg at 40° C. to remove 80 g of solvent. The resulting solution was stirred for 1 hour after addition of butylacetate (170 g). A colorless transparent solution (225 g) was obtained after filtration through a 0.8 μ-filter and found to have a number average molecular weight of 3,000. This polymer was designated polymer H. The total number of hydroxyl and/or alkoxy groups in the side chain and/or terminal might be 0.8 judging from the each peak detected with $^1$H $^{13}$C and $^{29}$Si-nmr and the molar ratio of 3-methacryloxypropyl group, methyl group and phenyl group in the side chain of the resulting polyorganosiloxane was 5/4/1, which corresponded to the molar ratio of the starting monomers charged.

In a 300 mL flask fitted with a thermometer, a mechanical stirrer, a nitrogen gas inlet and a reflux condenser, were added a solution of 24.5 g of polymer H, 1.36 g of polymer E, 33.7 g of 2-hydroxyethyl methacrylate, 17.3 g of methyl methacrylate, 49.1 g of n-butyl methacrylate, 15.9 g of 2-ethylhexyl acrylate, 2.18 g of acrylic acid and 2.44 g of dodecylmercaptane, and the mixture was stirred for 30 minutes in flowing nitrogen atmosphere to obtain a monomer mixture.

In a 300 mL flask fitted with a thermometer, a mechanical stirrer, a nitrogen gas inlet and a reflux condenser, were added 26.6 g of the monomer mixture obtained above and 55.0 g of butyl acetate, and the mixture was stirred for 30 minutes at room temperature in flowing nitrogen atmosphere. After adding 12.4 g of a 7.9% butyl acetate solution of dimethyl 2,2'-azobis(2-methylpropionate) to the mixture, the temperature of the mixture was increased to 80° C. and maintained at that temperature for 30 minutes in flowing nitrogen gas atmosphere. 106 g of the monomer mixture was then further added to the reaction mixture. The reaction mixture however formed a gel after 2 hours.

COMPARATIVE EXAMPLE 3

In a 500 mL three-neck round bottom flask, fitted with a condenser capped with a gas outlet, a mechanical stirrer, a thermometer and a nitrogen gas inlet under flowing nitrogen atmosphere, were added 39.5 mmol of 3-methacryloxypropyltrimethoxysilane (9.8 g), 434 mmol of methyltriethoxysilane (77.4 g), 12.2 mmol of phenyltrimethoxysilane (2.42 g) and 2,431 mmol of water (43.8 g), and the mixture was cooled to 5° C. After 5 g of 3.6% aqueous HCl solution (4.9 mmol of HCl) was added to the mixture over 30 minutes, the mixture was kept at 10° C. for 1 hour. The reaction temperature was maintained at 70° C. by controlling the temperature of the reaction vessel in a water bath. The hydrolytic condensation reaction was conducted in flowing nitrogen atmosphere, however the reaction mixture was getting viscous and formed a gel after 2.5 hours.

COMPARATIVE EXAMPLE 4

In a 300 mL three-neck round bottom flask, fitted with a condenser capped with a gas outlet, a mechanical stirrer, a thermometer and a nitrogen gas inlet under flowing nitrogen atmosphere, were added 39.5 mmol of 3-methacryloxypropyltrimethoxysilane (9.8 g), 434 mmol of methyltriethoxysilane (77.4 g), 12.2 mmol of phenyltrimethoxysilane (2.42 g) and 1,848 mmol of water (33.3 g), and the mixture was cooled to 5° C. After 6.6 g of 26.9% aqueous HCl solution (48.7 mmol of HCl) was added to the mixture over 30 minutes, the mixture was kept at 10° C. for 1 hour. The reaction temperature was maintained at 70° C. by controlling the temperature of the reaction vessel in a water bath. The hydrolytic condensation reaction was conducted in flowing nitrogen atmosphere for 3 hours and after which the silylating reaction was conducted for 3 hours by adding 77.6 mmol of hexamethyldisiloxane (12.6 g). The resulting solution was cooled to 40° C. A 5% methanol solution of KOH (54.4 g, 48.5 mmol) was added Go the solution and the mixture was kept overnight at room temperature. The mixture was separated into two layers, and the bottom layer was separated. Butylacetate was added to the bottom layer and the mixture was evaporated under 200 mmHg at 40° C., however the reaction mixture was getting viscous and partially formed a gel during the evaporation.

COMPARATIVE EXAMPLE 5

In a 300 mL three-neck round bottom flask, fitted with a condenser capped with a gas outlet, a mechanical stirrer, a thermometer and a nitrogen gas inlet under flowing nitrogen atmosphere, were added 39.5 mmol of 3-methacryloxypropyltrimethoxysilane (9.8 g), 434 mmol of methyltriethoxysilane (77.4 g), 12.2 mmol of phenyltrimethoxysilane (2.42 g) and 1,460 mmol of water (26.3 g), and the mixture was cooled to 5° C. After 5 g of 3.6% aqueous HCl solution (4.9 mmol of HCl) was added to the mixture over 30 minutes, the mixture was kept at 10° C. for 1 hour. The reaction temperature was maintained at 70° C. by controlling the temperature of the reaction vessel in a water bath. The hydrolytic condensation reaction was conducted in flowing nitrogen atmosphere for 3 hours and after which the silylating reaction was conducted for 3 hours by adding 9.7 mmol of hexamethyldisiloxane (1.58 g). The resulting solution was cooled to 40° C. A 5% methanol solution of KOH (5.5 g, 4.9 mmol) was added to the solution and the mixture was kept overnight at room temperature. The mixture was separated into two layers, and the bottom layer was separated. The total number of hydroxyl and/or alkoxy groups in the side chain and/or terminal might be 3.5 judging from the each peak detected with $^1$H, $^{13}$C and $^{29}$Si-nmr of the bottom layer. Butylacetate was added to the bottom layer and the mixture was evaporated under 200 mmHg at 40° C., however the reaction mixture was getting viscous and partially formed a gel during the evaporation.

As described and demonstrated above, the polyorganosiloxane according to the present invention can be prepared without involving gelation. The polyorganosiloxane is an excellent prepolymer for preparing a copolymer resin containing a polymethylsilsesquioxane structure and having excellent storage stability.

The copolymer resin according to the present invention provides a resin having high hardness and excellent weather resistance on three-dimensional curing.

While the invention has been described in detail and with reference to specific examples thereof, it will be apparent to one skilled in the art that various changes and modifications can be made therein without departing from the spirit and scope thereof.

What is claimed is:

1. A polyorganosiloxane comprising a repeating unit represented by formula (I) and an end cap group represented by formula (II):

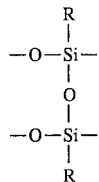
(I)

(II)

said polyorganosiloxane further comprising an end group represented by formula (III), an end group represented by formula (IV), and a repeating unit represented by formula (V):

(III)

(IV)

(V)

in such a manner that the average number of the group represented by OR$^1$ directly bonded to the silicon atom is 0 or more and less than 2 per one molecule of said polyorganosiloxane, said polyorganosiloxane having a number average molecular weight of from 500 to 100,000, wherein from 50 to 99% by mole of R represents a methyl group, from 1 to 40% by mole of R represents a group capable of being copolymerized with a polymerizable monomer or capable of reacting with a polymer, and the balance of R represents an alkyl group having from 2 to 8 carbon atoms or an unsubstituted or substituted phenyl group; R$^1$ represents a hydrogen atom or an alkyl group having from 1 to 4 carbon atoms, plurality of R$^1$ may be the same or different; and R$^2$ represents an alkyl group having from 1 to 8 carbon atoms or an aryl group having from 6 to 8 carbon atoms, plurality of R$^2$ may be the same or different.

2. A polyorganosiloxane as claimed in claim 1, wherein R$^2$ represents a methyl group.

3. A polyorganosiloxane as claimed in claim 1, wherein said group capable of being copolymerized with a polymerizable monomer or capable of reacting with a polymer is selected from the group consisting of a vinyl group, an acryl group, a methacryl group, an alkenyl group, an epoxy group, an amino group, a mercapto group, an alcoholic hydroxyl group, a carboxyl group, an amidoxime group, a sulfo group, a chlorosulfo group, an aldehyde group, an acetylacetonato group, and organic groups having these groups.

4. A process for producing a polyorganosiloxane comprising a repeating unit represented by formula (I) and an end cap group represented by formula (II):

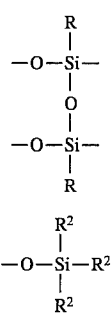
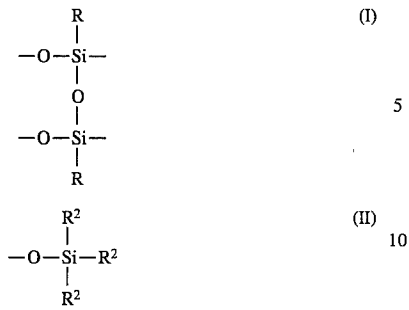

said polyorganosiloxane further comprising an end group represented by formula (III), an end group represented by formula (IV), and a repeating unit represented by formula (V):

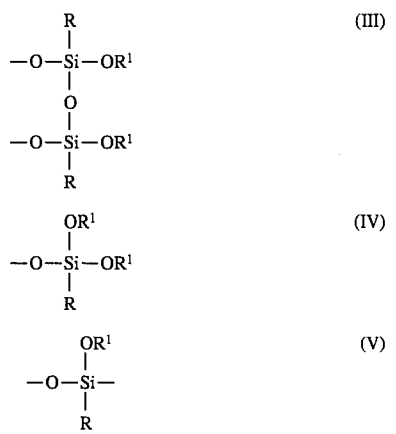

in such a manner that the average number of the group represented by $OR^1$ directly bonded to the silicon atom is 0 or more and less than 2 per one molecule of said polyorganosiloxane, said polyorganosiloxane having a number average molecular weight of from 500 to 100,000, wherein from 50 to 99% by mole of R represents a methyl group, from 1 to 40% by mole of R represents a group capable of being copolymerized with a polymerizable monomer or capable of reacting with a polymer, and the balance of R represents an alkyl group having from 2 to 8 carbon atoms or an unsubstituted or substituted phenyl group; $R^1$ represents a hydrogen atom or an alkyl group having from 1 to 4 carbon atoms, plurality of $R^1$ may be the same or different; and $R^2$ represents an alkyl group having from 1 to 8 carbon atoms or an aryl group having from 6 to 8 carbon atoms, plurality of $R^2$ may be the same or different, said process comprising the steps of:
preparing a starting polyorganosiloxane comprising a repeating unit represented by formula (I) and an end group represented by formula (III) and may further comprising an end group represented by formula (IV) and a repeating unit represented by formula (V); and reacting said starting polyorganosiloxane with a monofunctional silylating agent to substitute the group represented by $OR^1$ directly bonded to the silicon atom with an end cap group represented by formula (II), in such a manner that the average number of the group represented by $OR^1$ becomes 0 or more and less than 2 per one molecule of said polyorganosiloxane.

5. A process as claimed in claim 4, wherein
said preparation step of said starting polyorganosiloxane comprises a hydrolytic condensation reaction of a compound represented by formula (VI):

$$R-Si(OR^1)_3 \qquad (VI)$$

wherein $R^1$ represents an alkyl group having from 1 to 4 carbon atoms; and R has the same meaning as above, and an alcohol by-produced in said hydrolytic condensation reaction is used as a solvent for said substitution reaction of said end cap group represented by formula (II).

6. A process as claimed in claim 4, wherein $R^2$ represents a methyl group, and said monofunctional silylating agent is hexamethyldisiloxane.

7. A process as claimed in claim 5, wherein said hydrolytic condensation reaction of a compound represented by formula (VI) is conducted with using water in an amount of from 2 to 4 times by mole the amount of said compound represented by formula (VI).

8. A process as claimed in claim 5, wherein said hydrolytic condensation reaction of a compound represented by formula (VI) is conducted with using an acidic catalyst in an amount of from 0.005 to 0.05 times by mole the amount of said compound represented by formula (VI).

9. A copolymer resin comprising said polyorganosiloxane as claimed in claim 1 copolymerized with a monomer capable of reacting with said group represented by R capable of being copolymerized with said monomer.

10. A copolymer resin as claimed in claim 9, which comprises said polyorganosiloxane copolymerized with a polydialkylsiloxane having at least one ethylenic polymerizable group per one molecule and an ethylenic monomer.

11. A copolymer resin as claimed in claim 9, which comprises said polyorganosiloxane, wherein said group represented by R capable of being copolymerized with a monomer is a 3-methacryloxypropyl group, said polyorganosiloxane being copolymerized with an acrylic acid, a methacrylic acid, or an ester thereof, in the presence of a radical polymerization initiator.

12. A copolymer resin comprising said polyorganosiloxane as claimed in claim 1 reacted with a polymer capable of reacting with said group represented by R capable of being reacted with said polymer.

13. A method for crosslinking a copolymer resin comprising a polyorganosiloxane having a repeating unit represented by Formula (I) and an end cap group represented by Formula (II):

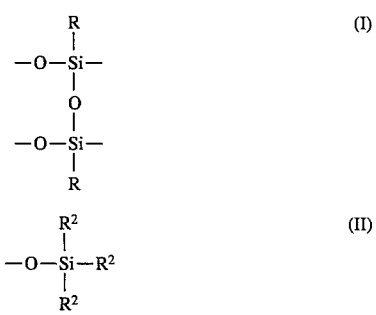

said polyorganosiloxane further having an end group represented by Formula (III), an end group represented by Formula (IV), and a repeating unit represented by Formula (V):

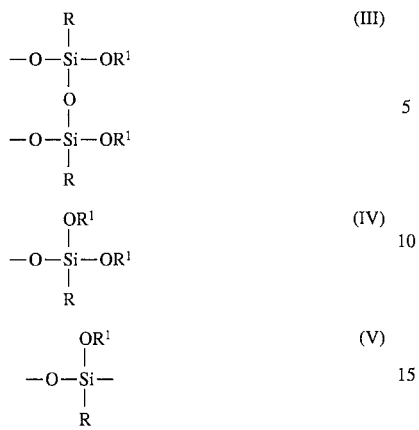

in such a manner that the average number of the group represented OR$^1$ directly bonded to the silicon atom is 0 or more and less than 2 per one molecule of said polyorganosiloxane, said polyorganosiloxane having a number average molecular weight of from 500 to 100,000, wherein 50 to 99% by mole of R represents a methyl group, from 1 to 40% by mole of R represents a group capable of being copolymerized with a polymerizable monomer, and the balance of R represents an alkyl group having from 2 to 8 carbon atoms or an unsubstituted or substituted phenyl group; R$^1$ represents a hydrogen atom or an alkyl group having from 1 to 4 carbon atoms, plurality of R$^1$ may be the same or different; and R$^2$ represents an alkyl group having from 1 to 8 carbon atoms or an aryl group having from 6 to 8 carbon atoms, plurality of R$^2$ may be the same or different, copolymerized with a monomer capable of reacting with said R group of said polyorganosiloxane comprising the step of crosslinking said copolymer resin with an isocyanate compound or a methylolmelamin.

14. A method for crosslinking a copolymer resin comprising a polyorganosiloxane having a repeating unit represented by Formula (I) and an end cap group represented by Formula (II):

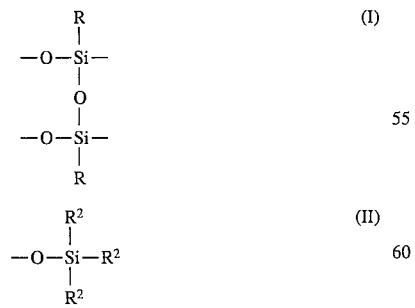

said polyorganosiloxane further having an end group represented by Formula (III), an end group represented by Formula (IV), and a repeating unit represented by Formula (V):

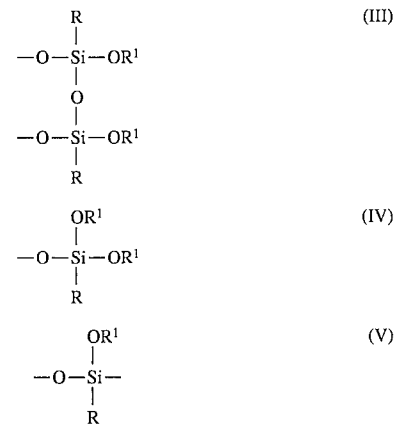

in such a manner that the average number of the group represented by OR$^1$ directly bonded to the silicon atom is 0 or more and less than 2 per one molecule of said polyorganosiloxane, said polyorganosiloxane having a number average molecular weight of from 500 to 100,000, wherein 50 to 99% by mole of R represents a methyl group, from 1 to 40% by mole of R represents a group capable of reacting with a polymer, and the balance of R represents an alkyl group having from 2 to 8 carbon atoms or an unsubstituted or substituted phenyl group; R$^1$ represents a hydrogen atom or an alkyl group having from 1 to 4 carbon atoms, plurality of R$^1$ may be the same or different; and R$^2$ represents an alkyl group having from 1 to 8 carbon atoms or an aryl group having from 6 to 8 carbon atoms, plurality of R$^2$ may be the same or different, reacted with a polymer capable of reacting with said R group of said polyorganosiloxane, comprising the step of crosslinking said copolymer resin with an isocyanate compound or a methylolmelamin.

15. A method for crosslinking a copolymer resin comprising a polyorganosiloxane having a repeating unit represented by Formula (I) and an end cap group represented by Formula (II):

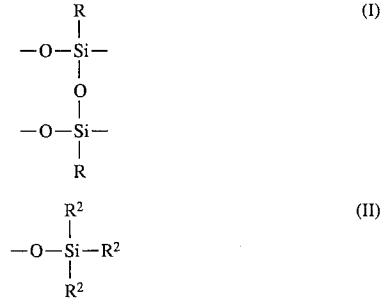

said polyorganosiloxane further having an end group represented by Formula (III), an end group represented by Formula (IV), and a repeating unit represented by Formula (V):

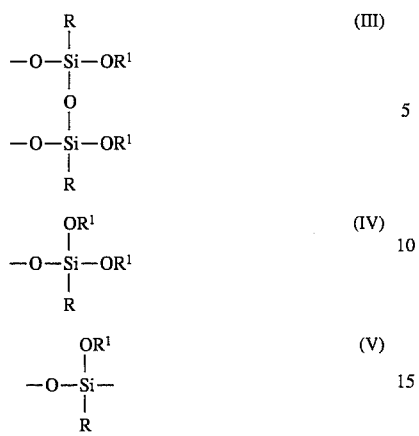

in such a manner that the average number of the group represented by $OR^1$ directly bonded to the silicon atom is 0 or more and less than 2 per one molecule of said polyorganosiloxane, said polyorganosiloxane having a number average molecular weight of from 500 to 100,000, wherein 50 to 99% by mole of R represents a methyl group, from 1 to 40% by mole of R represents a group capable of being copolymerized with a polymerizable monomer, and the balance of R represents an alkyl group having from 2 to 8 carbon atoms or an unsubstituted or substituted phenyl group; $R^1$ represents a hydrogen atom or an alkyl group having from 1 to 4 carbon atoms, plurality of $R^1$ may be the same or different; and $R^2$ represents an alkyl group having from 1 to 8 carbon atoms or an aryl group having from 6 to 8 carbon atoms, plurality of $R^2$ may be the same or different, copolymerized with a monomer capable of reacting with said R group of said polyorganosiloxane, comprising the step of crosslinking said copolymer resin by reacting a carboxylic group with an epoxy group, both contained in said copolymer.

16. A method for crosslinking a copolymer resin comprising a polyorganosiloxane having a repeating unit represented by Formula (I) and an end cap group represented by Formula (II):

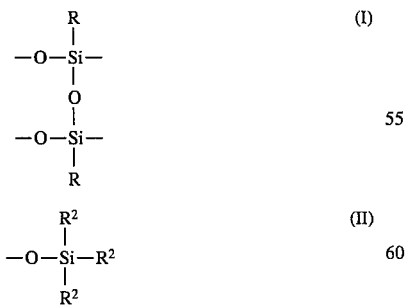

said polyorganosiloxane further having an end group represented by Formula (III), an end group represented by Formula (IV), and a repeating unit represented by Formula (V):

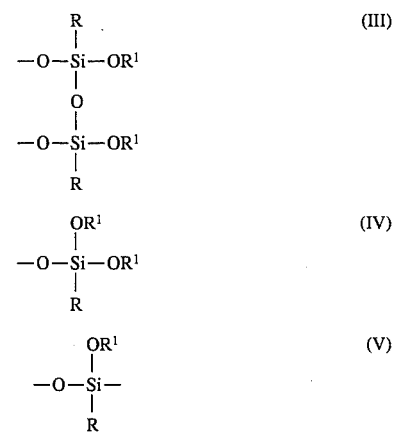

in such a manner that the average number of the group represented by $OR^1$ directly bonded to the silicon atom is 0 or more and less than 2 per one molecule of said polyorganosiloxane, said polyorganosiloxane having a number average molecular weight of from 500 to 100,000, wherein 50 to 99% by mole of R represents a methyl group, from 1 to 40% by mole of R represents a group capable of reacting with a polymer, and the balance of R represents an alkyl group having from 2 to 8 carbon atoms or an unsubstituted or substituted phenyl group; $R^1$ represents a hydrogen atom or an alkyl group having from 1 to 4 carbon atoms, plurality of $R^1$ may be the same or different; and $R^2$ represents an alkyl group having from 1 to 8 carbon atoms or an aryl group having from 6 to 8 carbon atoms, plurality of $R^2$ may be the same or different, reacted with a polymer capable of reacting with said R group of said polyorganosiloxane, comprising the step of crosslinking said copolymer resin by reacting a carboxylic group with an epoxy group, both contained in said copolymer.

17. A coating composition comprising said copolymer resin as claimed in claim 9.

18. A coating composition comprising said copolymer resin as claimed in claim 12.

19. A method for forming a coating layer of a copolymer resin on a substrate, said copolymer resin comprising a polyorganosiloxane having a repeating unit represented by Formula (I) and an end cap group represented by Formula (II):

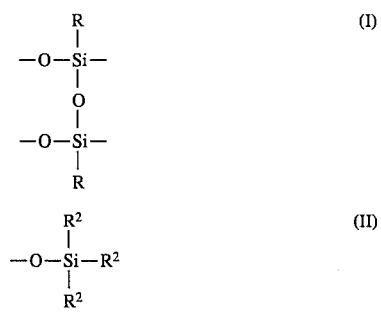

said polyorganosiloxane further having an end group represented by Formula (III), an end group represented by Formula (IV), and a repeating unit represented by Formula (V):

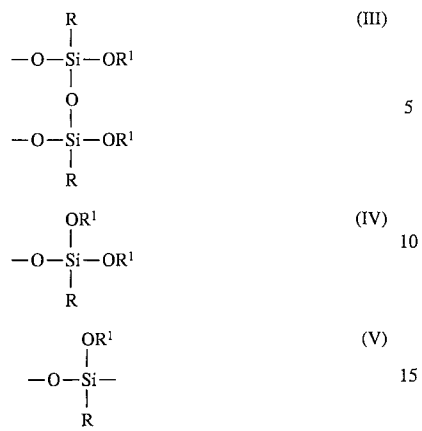

in such a manner that the average number of the group represented by $OR^1$ directly bonded to the silicon atom is 0 or more and less than 2 per one molecule of said polyorganosiloxane, said polyorganosiloxane having a number average molecular weight of from 500 to 100,000, wherein 50 to 99% by mole of R represents a methyl group, from 1 to 40% by mole of R represents a group capable of being copolymerized with a polymerizable monomer, and the balance of R represents an alkyl group having from 2 to 8 carbon atoms or an unsubstituted or substituted phenyl group; $R^1$ represents a hydrogen atom or an alkyl group having from 1 to 4 carbon atoms, plurality of $R^1$ may be the same or different; and $R^2$ represents an alkyl group having from 1 to 8 carbon atoms or an aryl group having from 6 to 8 carbon atoms, plurality of $R^2$ may be the same or different, copolymerized with a monomer capable of reacting with said R group of said polyorganosiloxane, comprising the steps of (A) providing said resin on said substrate and (B) crosslinking said copolymer resin with an isocyanate compound or a methylomelamine to form said coating layer on said substrate.

20. A method for forming a coating layer of a copolymer resin on a substrate, said copolymer resin comprising a polyorganosiloxane having a repeating unit represented by Formula (I) and an end cap group represented by Formula (II):

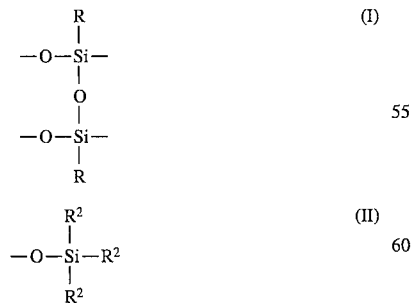

said polyorganosiloxane further having an end group represented by Formula (III), an end group represented by Formula (IV), and a repeating unit represented by Formula (V):

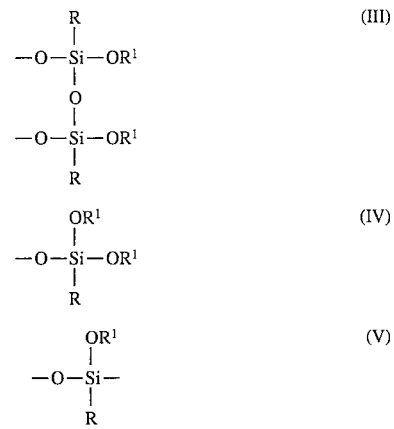

in such a manner that the average number of the group represented by $OR^1$ directly bonded to the silicon atom is 0 or more and less than 2 per one molecule of said polyorganosiloxane, said polyorganosiloxane having a number average molecular weight of from 500 to 100,000, wherein 50 to 99% by mole of R represents a methyl group, from 1 to 40% by mole of R represents a group capable of reacting with a polymer, and the balance of R represents an alkyl group having from 2 to 8 carbon atoms or an unsubstituted or substituted phenyl group; $R^1$ represents a hydrogen atom or an alkyl group having from 1 to 4 carbon atoms, plurality of $R^1$ may be the same or different; and $R^2$ represents an alkyl group having from 1 to 8 carbon atoms or an aryl group having from 6 to 8 carbon atoms, plurality of $R^2$ may be the same or different, reacted with a polymer capable of reacting with said R group of said polyorganosiloxane comprising the steps of (A) providing said resin on said substrate and (B) crosslinking said copolymer resin with an isocyanate compound or a methylomelamine, to form said coating layer on said substrate.

21. A method for forming a coating layer of a copolymer resin on a substrate, said copolymer resin comprising a polyorganosiloxane having a repeating unit represented by Formula (I) and an end cap group represented by Formula (II):

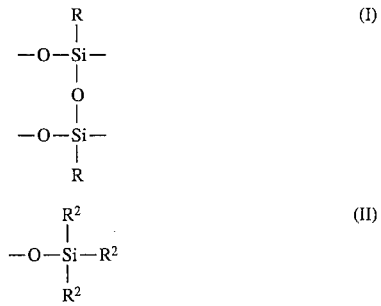

said polyorganosiloxane further having an end group represented by Formula (III), an end group represented by Formula (IV), and a repeating unit represented by Formula (V):

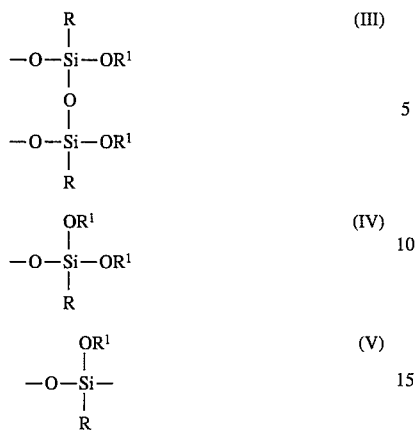

in such a manner that the average number of the group represented by $OR^1$ directly bonded to the silicon atom is 0 or more and less than 2 per one molecule of said polyorganosiloxane, said polyorganosiloxane having a number average molecular weight of from 500 to 100,000, wherein 50 to 99% by mole of R represents a methyl group, from 1 to 40% by mole of R represents a group capable of being copolymerized with a polymerizable monomer, and the balance of R represents an alkyl group having from 2 to 8 carbon atoms or an unsubstituted or substituted phenyl group; $R^1$ represents a hydrogen atom or an alkyl group having from 1 to 4 carbon atoms, plurality of $R^1$ may be the same or different; and $R^2$ represents an alkyl group having from 1 to 8 carbon atoms or an aryl group having from 6 to 8 carbon atoms, plurality of $R^2$ may be the same or different, copolymerized with a monomer capable of reacting with said R group of said polyorganosiloxane, comprising the steps of (A) providing said resin on said substrate and (B) crosslinking said copolymer resin by a reaction of a carboxylic group with an epoxy group, both contained in said copolymer, to form said coating layer on said substrate.

22. A method for forming a copolymer resin-containing on a substrate, said copolymer resin comprising a polyorganosiloxane having a repeating unit represented by Formula (I) and an end cap group represented by Formula (II):

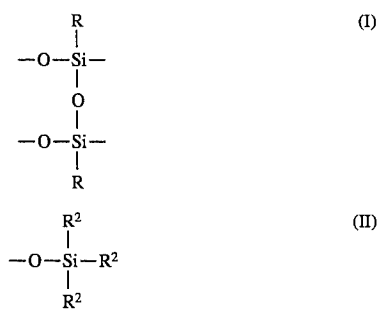

said polyorganosiloxane further having an end group represented by Formula (III), an end group represented by Formula (IV), and a repeating unit represented by Formula (V):

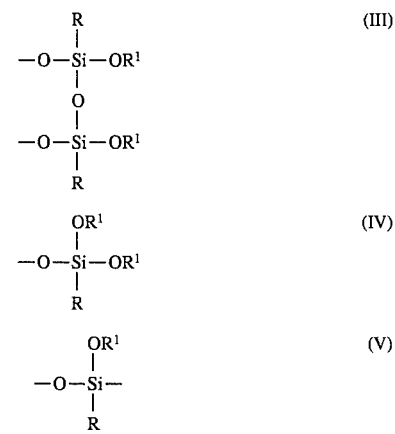

in such a manner that the average number of the group represented by $OR^1$ directly bonded to the silicon atom is 0 or more and less than 2 per one molecule of said polyorganosiloxane, said polyorganosiloxane having a number average molecular weight of from 500 to 100,000, wherein 50 to 99% by mole of R represents a methyl group, from 1 to 40% by mole of R represents a group capable of reacting with a polymer, and the balance of R represents an alkyl group having from 2 to 8 carbon atoms or an unsubstituted or substituted phenyl group; $R^1$ represents a hydrogen atom or an alkyl group having from 1 to 4 carbon atoms, plurality of $R^1$ may be the same or different; and $R^2$ represents an alkyl group having from 1 to 8 carbon atoms or an aryl group having from 6 to 8 carbon atoms, plurality of $R^2$ may be the same or different, reacted with a polymer capable of reacting with said R group of said polyorganosiloxane, comprising the steps of (A) providing said resin on said substrate and (B) crosslinking said copolymer resin by a reaction of a carboxylic group with an epoxy group, both contained in said copolymer resin, to form said coating layer on said substrate.

23. A process as claimed in claim 4, wherein said group capable of being copolymerized with a polymerizable monomer or capable of reacting with a polymer is selected from the group consisting of a vinyl group, an acryl group, a methacryl group, an alkenyl group, an epoxy group, an amino group, a mercapto group, an alcoholic hydroxyl group, a carboxyl group, an amidoxime group, a sulfo group, a chlorosulfo group, an aldehyde group, an acetylacetonato group, and organic groups having these groups.

24. A process as claimed in claim 4, wherein said step of reacting said starting polyorganosiloxane with said monofunctional silylating agent further comprises adding said silylating agent to a solution of said starting polyorganosiloxane.

25. A process as claimed in claim 4, wherein said step of reacting said starting polyorganosiloxane with said monofunctional silylating agent further comprises determining the amount of $OR^1$ groups of said starting polyorganosiloxane, and reacting said starting polyorganosiloxane with said silylating agent, in such a manner that the average number of $OR^1$ groups directly bonded to the silicon atom is 0 or more but less than 2 per one molecule of said polyorganosiloxane.

26. A copolymer resin as claimed in claim 12, wherein said polymer is selected from the group consisting of acrylic resins, polyolefin resins, vinyl resins, polyester resins, polyether resins, polyamide resins, polyimide resins, polyurethane resins, fluorine resins, epoxy resins, and amino resins.

* * * * *